(12) United States Patent
Nagano et al.

(10) Patent No.: US 7,186,454 B2
(45) Date of Patent: Mar. 6, 2007

(54) DIELECTRIC FILMS AND MATERIALS THEREFOR

(75) Inventors: Shinya Nagano, Himeji (JP); Jiichiro Hashimoto, Himeji (JP); Kiyoharu Tsutsumi, Himeji (JP); Yoshinori Funaki, Himeji (JP)

(73) Assignee: Daicel Chemical Industries, Ltd., Osaka (JP)

( * ) Notice: Subject to any disclaimer, the term of this patent is extended or adjusted under 35 U.S.C. 154(b) by 154 days.

(21) Appl. No.: 10/807,426

(22) Filed: Mar. 24, 2004

(65) Prior Publication Data

US 2004/0175858 A1 Sep. 9, 2004

(30) Foreign Application Priority Data

Mar. 26, 2003 (JP) ............................. 2003-086165
Sep. 18, 2003 (JP) ............................. 2003-325519

(51) Int. Cl.
*B32B 27/00* (2006.01)
*C08G 73/10* (2006.01)

(52) U.S. Cl. ................... 428/209; 428/458; 428/473.5; 524/538; 528/125; 528/128; 528/172; 528/173; 528/174; 528/175; 528/183; 528/186; 528/188; 528/220; 528/229; 528/350; 528/353

(58) Field of Classification Search ............... 528/125, 528/128, 172, 173, 174, 175, 183, 186, 188, 528/220, 229, 350, 353; 524/538; 428/209, 428/458, 473.5
See application file for complete search history.

(56) References Cited

U.S. PATENT DOCUMENTS 4,142,036 A 2/1979 Feinstein et al.
2002/0034873 A1 3/2002 Aoi

FOREIGN PATENT DOCUMENTS

JP 62-183881 A 8/1987
JP 2001-332543 A 11/2001

OTHER PUBLICATIONS

W. Guo et al., Tetrahedron Letters, 41 (2000) 7419-7421.
Y-T. Chern et al., Journal of Polymer Science: Part A: Polymer Chemistry, vol. 36, 785-792, (1998).
S-H. Hsiao et al., Journal of Polymer Science: Part A: Polymer Chemistry, vol. 376, 1619-1628 (1999).
Moon et al., *Journal of Polymer Science*, Part A-1, vol. 8, No. 12, (1970), pp. 3665-3666.

*Primary Examiner*—Ana Woodward
(74) *Attorney, Agent, or Firm*—Birch, Stewart, Kolasch & Birch, LLP

(57) ABSTRACT

A material for dielectric films is a polymerizable composition containing an organic solvent, and an adamantanepolycarboxylic acid derivative represented by following Formula (1):

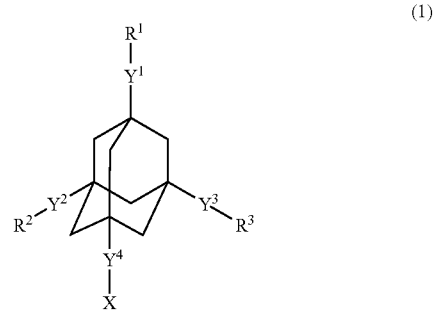

wherein X is hydrogen atom, a hydrocarbon group or $R^4$; $R^1$, $R^2$, $R^3$ and $R^4$ and are each independently a protected or unprotected carboxyl group, etc.; and $Y^1$, $Y^2$, $Y^3$ and $Y^4$ are each independently a single bond or a bivalent aromatic cyclic group; and an aromatic polyamine derivative represented by following Formula (2):

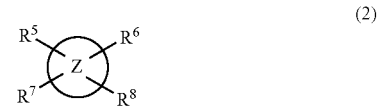

wherein Ring Z is a monocyclic or polycyclic aromatic ring; and $R^5$, $R^6$, $R^7$ and $R^8$ are each a substituent bound to Ring Z and are each independently a protected or unprotected amino group, etc., dissolved in the organic solvent.

7 Claims, 1 Drawing Sheet

DIELECTRIC FILMS AND MATERIALS THEREFOR

This Nonprovisional application claims priority under 35 U.S.C. § 119(a) on Patent Application No(s). JP2003-086165 and JP2003-325519 filed in JAPAN on Mar. 26, 2003 and Sep. 18, 2003, respectively, the entire contents of which are hereby incorporated by reference.

BACKGROUND OF THE INVENTION

1. Field of the Invention

The present invention relates to a material for the formation of a polybenzazole (imidazole, oxazole or thiazole) film having high heat resistance and a low dielectric constant, as well as a polymer and a dielectric film using the material. More specifically, it relates to a material for the formation of a dielectric film which is useful as a semiconductor part, as well as a polymer and a dielectric film using the material.

2. Description of the Related Art

Polybenzazoles having an adamantane skeleton are useful as highly heat-resistant resins (Journal of Polymer Science, Part A-1 (1970), 8(12), p. 3665–3666). In particular, highly crosslinked polybenzazoles using a trifunctional or tetrafunctional adamantane derivative involve a multitude of molecular-scale voids, have a low relative dielectric constant, satisfactory mechanical strength and heat resistance and are thereby very useful as materials for interlayer dielectrics (Japanese Unexamined Patent Application Publication (JP-A) No. 2001-332543). These highly crosslinked polybenzazoles can be prepared, for example, by heating a material in the presence of a condensing agent such as a polyphosphoric acid. However, the resulting highly crosslinked resin is hardly soluble in solvent and cannot be significantly applied to a substrate by coating to form a thin film having a sufficient thickness as an interlayer dielectric.

A thin film of a wholly aromatic chain polybenzazole is formed by a method, in which an aldehyde derivative as a material monomer is spread over an aqueous solution of an amine as another material monomer to form a film by polymerization on a gas-liquid interface; the film is laminated on a substrate by a horizontal attachment method and is subjected to a thermal treatment in the air to form a thin film of a polybenzazole (Japanese Unexamined Patent Application Publication (JP-A) No. 62-183881). However, the method is not suitable for industrial production, since it takes quite a long time to form the thin film. In addition, the precursor polyimine is subjected to an oxidative thermal treatment in a final process, and the resulting polybenzazole film may be possibly oxidized, thus a lower dielectric constant as a dielectric film is not expected.

In addition, adamantanepolycarboxylic acids and aromatic polyamines used as material monomers have a significantly high polarity as a compound and are soluble in quite limited types of solvents. In particular, these monomers are hardly soluble in a solvent having a relatively low polarity, and a film having a thickness of several hundreds of nanometers required as an interlayer dielectric for a semiconductor device cannot be significantly formed. Thus, satisfactory dielectric films of highly crosslinked polybenzazoles using a trifunctional or tetrafunctional adamantane have not been formed.

SUMMARY OF THE INVENTION

Accordingly, an object of the present invention is to provide a material for dielectric films, which contains components capable of constituting a highly crosslinked polybenzazole and can easily form a film having a sufficient thickness as an interlayer dielectric, as well as to provide a polymer and a dielectric film formed from the material.

Another object of the present invention is to provide a material that can form a dielectric film containing a polybenzazole having high heat resistance and a low dielectric constant and being usable as, for example, a semiconductor part, as well as to provide a polymer and a dielectric film formed from the material.

After intensive investigations to achieve the above objects, the present inventors have found that, by converting at least one of an adamantanepolycarboxylic acid and an aromatic polyamine as monomer components into a derivative which can be significantly highly dissolved in a solvent, the resulting material for dielectric films has a high monomer concentration and can form a dielectric film having a sufficient thickness as an interlayer dielectric. The present invention has been accomplished based on these findings.

Specifically, the present invention provides, in a first aspect, a material for dielectric films, which is a polymerizable composition containing an adamantanepolycarboxylic acid derivative represented by following Formula (1):

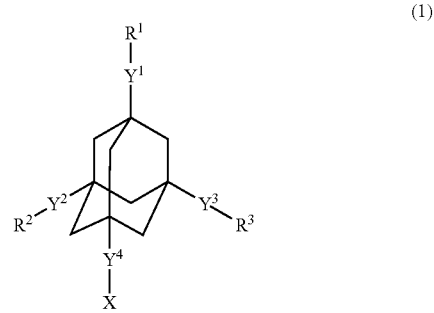

wherein X is a hydrogen atom, a hydrocarbon group or $R^4$; $R^1$, $R^2$, $R^3$ and $R^4$ may be the same as or different from one another and are each a carbonyl halide group or a carboxyl group which may be protected by a protecting group; and $Y^1$, $Y^2$, $Y^3$ and $Y^4$ may be the same as or different from one another and are each a single bond or a bivalent aromatic cyclic group, wherein at least one of $R^1$, $R^2$ and $R^3$ is a carbonyl halide group or a protected carboxyl group when X is a hydrogen atom or a hydrocarbon group, and at least one of $R^1$, $R^2$, $R^3$ and $R^4$ is a carbonyl halide group or a protected carboxyl group when X is $R^4$; an aromatic polyamine derivative represented by following Formula (2):

wherein Ring Z is a monocyclic or polycyclic aromatic ring; $R^5$, $R^6$, $R^7$ and $R^8$ are each a substituent bound to Ring Z, $R^5$ and $R^6$ may be the same as or different from each other and are each an amino group which may be protected by a protecting group, and $R^7$ and $R^8$ may be the same as or different from each other and are each an amino group which may be protected by a protecting group, a hydroxyl group which may be protected by a protecting group, or a mercapto group which may be protected by a protecting group, wherein at least one of $R^7$ and $R^8$ is a protected amino group, a protected hydroxyl group or a protected mercapto group when $R^5$ and $R^6$ are both amino groups; and an organic solvent, the adamantanepolycarboxylic acid derivative and the aromatic polyamine derivative being dissolved in the organic solvent.

The present invention also provides, in a second aspect, a material for dielectric films, which is a polymerizable composition containing an adamantanepolycarboxylic acid represented by following Formula (1a):

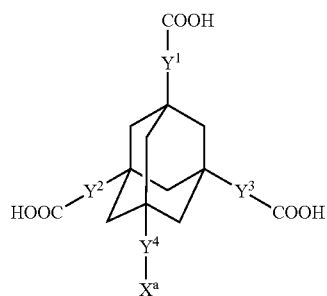

(1a)

wherein $X^a$ is a hydrogen atom, a carboxyl group or a hydrocarbon group; and $Y^1$, $Y^2$, $Y^3$ and $Y^4$ may be the same as or different from one another and are each a single bond or a bivalent aromatic cyclic group; an aromatic polyamine derivative represented by following Formula (2):

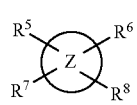

(2)

wherein Ring Z is a monocyclic or polycyclic aromatic ring; $R^5$, $R^6$, $R^7$ and $R^8$ are each a substituent bound to Ring Z, $R^5$ and $R^6$ may be the same as or different from each other and are each an amino group which may be protected by a protecting group, and $R^7$ and $R^8$ may be the same as or different from each other and are each an amino group which may be protected by a protecting group, a hydroxyl group which may be protected by a protecting group, or a mercapto group which may be protected by a protecting group, wherein at least one of $R^7$ and $R^8$ is a protected amino group, a protected hydroxyl group or a protected mercapto group when $R^5$ and $R^6$ are both amino groups; and an organic solvent, the adamantanepolycarboxylic acid and the aromatic polyamine derivative being dissolved in the organic solvent.

In a third aspect, the present invention provides a material for dielectric films, which is a polymerizable composition containing an adamantanepolycarboxylic acid derivative represented by following Formula (1):

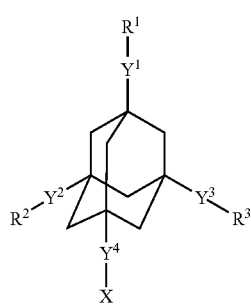

(1)

wherein X is a hydrogen atom, a hydrocarbon group or $R^4$; $R^1$, $R^2$, $R^3$ and $R^4$ may be the same as or different from one another and are each a carbonyl halide group or a carboxyl group which may be protected by a protecting group; and $Y^1$, $Y^2$, $Y^3$ and $Y^4$ may be the same as or different from one another and are each a single bond or a bivalent aromatic cyclic group, wherein at least one of $R^1$, $R^2$ and $R^3$ is a carbonyl halide group or a protected carboxyl group when X is a hydrogen atom or a hydrocarbon group, and at least one of $R^1$, $R^2$, $R^3$ and $R^4$ is a carbonyl halide group or a protected carboxyl group when X is $R^4$; an aromatic polyamine represented by following Formula (2a):

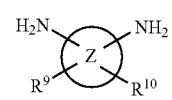

(2a)

wherein Ring Z is a monocyclic or polycyclic aromatic ring; and $R^9$ and $R^{10}$ are each a substituent bound to Ring Z, may be the same as or different from each other and are each an amino group, a hydroxyl group or a mercapto group; and an organic solvent, the adamantanepolycarboxylic acid derivative and the aromatic polyamine being dissolved in the organic solvent.

The present invention further provides, in a fourth aspect, a polymer which is a polymerized product of an adamantanepolycarboxylic acid derivative represented by following Formula (1):

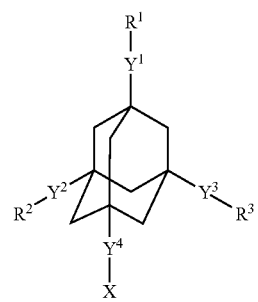

(1)

wherein X is a hydrogen atom, a hydrocarbon group or $R^4$; $R^1$, $R^2$, $R^3$ and $R^4$ may be the same as or different from one another and are each a carbonyl halide group or a carboxyl group which may be protected by a protecting group; and $Y^1$, $Y^2$, $Y^3$ and $Y^4$ may be the same as or different from one another and are each a single bond or a bivalent aromatic cyclic group, wherein at least one of $R^1$, $R^2$ and $R^3$ is a carbonyl halide group or a protected carboxyl group when X is a hydrogen atom or a hydrocarbon group, and at least one of $R^1$, $R^2$, $R^3$ and $R^4$ is a carbonyl halide group or a protected carboxyl group when X is $R^4$; and an aromatic polyamine derivative represented by following Formula (2):

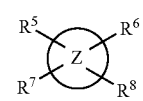

(2)

wherein Ring Z is a monocyclic or polycyclic aromatic ring; $R^5$, $R^6$, $R^7$ and $R^8$ are each a substituent bound to Ring Z, $R^5$ and $R^6$ may be the same as or different from each other and are each an amino group which may be protected by a protecting group, and $R^7$ and $R^8$ may be the same as or different from each other and are each an amino group which may be protected by a protecting group, a hydroxyl group which may be protected by a protecting group, or a mercapto group which may be protected by a protecting group, wherein at least one of $R^7$ and $R^8$ is a protected amino group, a protected hydroxyl group or a protected mercapto group when $R^5$ and $R^6$ are both amino groups.

The present invention further provides, in a fifth aspect, a polymer which is a polymerized product of an adamantane-polycarboxylic acid represented by following Formula (1a):

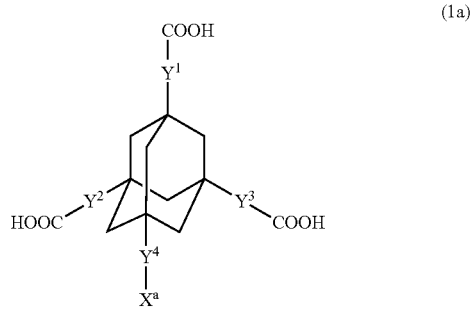

(1a)

wherein $X^a$ is a hydrogen atom, a carboxyl group or a hydrocarbon group; and $Y^1$, $Y^2$, $Y^3$ and $Y^4$ may be the same as or different from one another and are each a single bond or a bivalent aromatic cyclic group; and an aromatic polyamine derivative represented by following Formula (2):

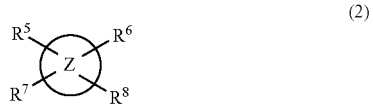

(2)

wherein Ring Z is a monocyclic or polycyclic aromatic ring; $R^5$, $R^6$, $R^7$ and $R^8$ are each a substituent bound to Ring Z, $R^5$ and $R^6$ may be the same as or different from each other and are each an amino group which may be protected by a protecting group, and $R^7$ and $R^8$ may be the same as or different from each other and are each an amino group which may be protected by a protecting group, a hydroxyl group which may be protected by a protecting group, or a mercapto group which may be protected by a protecting group, wherein at least one of $R^7$ and $R^8$ is a protected amino group, a protected hydroxyl group or a protected mercapto group when $R^5$ and $R^6$ are both amino groups.

The present invention also provides, in a sixth aspect, a polymer which is a polymerized product of an adamantane-polycarboxylic acid derivative represented by following Formula (1):

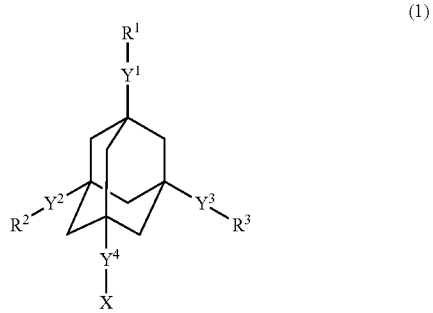

(1)

wherein X is a hydrogen atom, a hydrocarbon group or $R^4$; $R^1$, $R^2$, $R^3$ and $R^4$ may be the same as or different from one another and are each a carbonyl halide group or a carboxyl group which may be protected by a protecting group; and $Y^1$, $Y^2$, $Y^3$ and $Y^4$ may be the same as or different from one another and are each a single bond or a bivalent aromatic cyclic group, wherein at least one of $R^1$, $R^2$ and $R^3$ is a carbonyl halide group or a protected carboxyl group when X is a hydrogen atom or a hydrocarbon group, and at least one of $R^1$, $R^2$, $R^3$ and $R^4$ is a carbonyl halide group or a protected carboxyl group when X is $R^4$; and an aromatic polyamine represented by following Formula (2a)

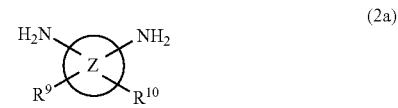

(2a)

wherein Ring Z is a monocyclic or polycyclic aromatic ring; and $R^9$ and $R^{10}$ are each a substituent bound to Ring Z, may be the same as or different from each other and are each an amino group, a hydroxyl group or a mercapto group.

In addition and advantageously, the present invention provides a dielectric film containing any of the polymers.

The materials for dielectric films of the present invention contain at least one of monomer components as a derivative, have significantly improved solubility in solvents and can form a dielectric film containing a highly crosslinked polybenzazole with an adamantane skeleton and having a sufficient thickness. By using such a derived monomer component, the materials can have increased solubility in various solvents and can form polybenzazole films having a wide variety of thickness for supporting various semiconductor manufacturing processes. The dielectric films formed by using these materials can have high heat resistance and a low dielectric constant.

Further objects, features and advantages of the present invention will become apparent from the following description of the preferred embodiments with reference to the attached drawing.

DESCRIPTION OF THE PREFERRED EMBODIMENTS

Figure 1:
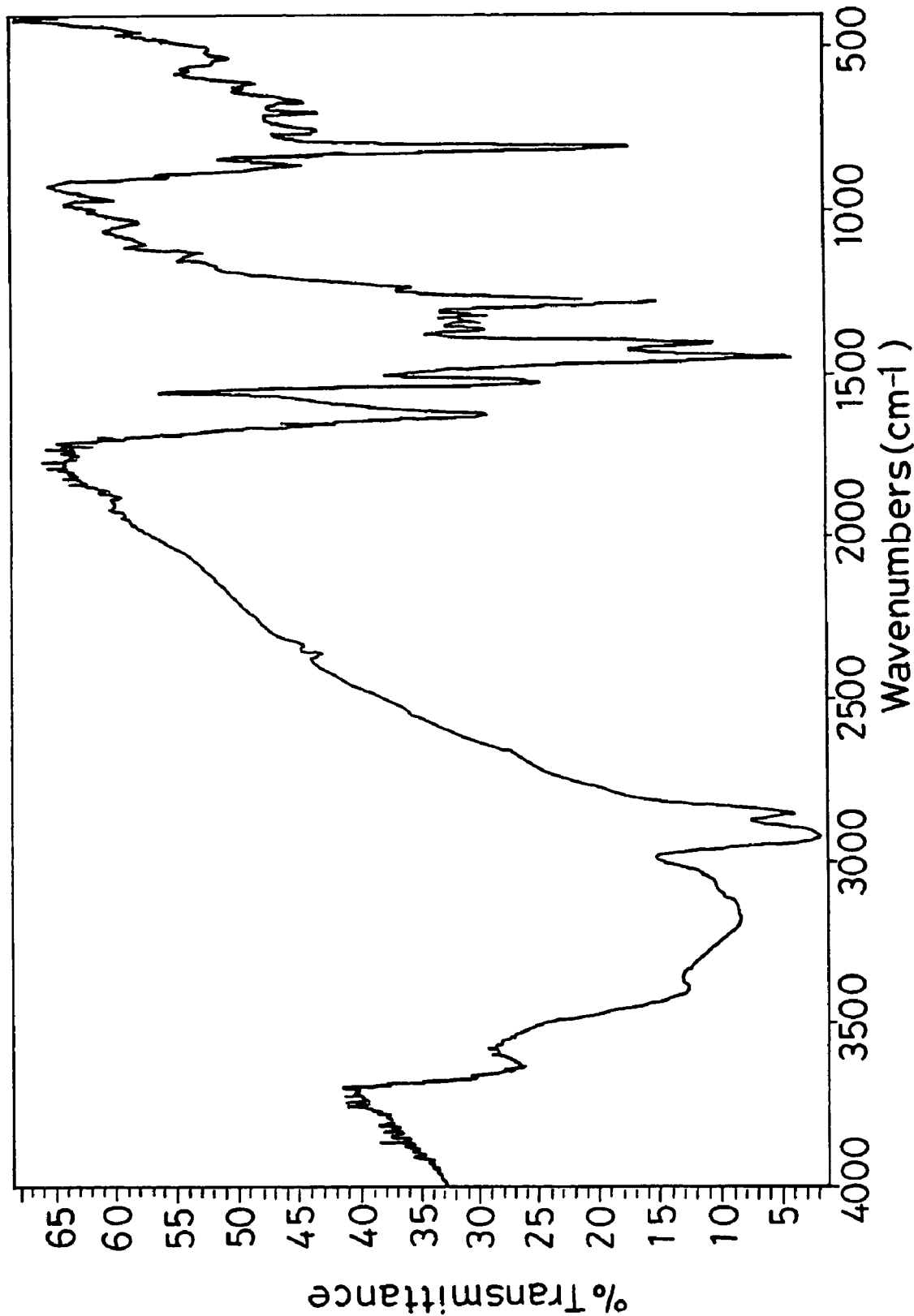
FIG. 1 shows an infrared absorption spectrum of a polymer film prepared in Example 1.

The material for dielectric films of the present invention comprises a polymerizable composition comprising an adamantanepolycarboxylic acid or a derivative thereof and an aromatic polyamine or a derivative thereof dissolved in an organic solvent.

Adamantanepolycarboxylic Acid and Derivative Thereof

The adamantanepolycarboxylic acids and derivatives thereof represented by Formula (1) or (1a) serve as a highly crosslinkable monomer component and constitute the material for dielectric films of the present invention. In these formulae, the hydrocarbon groups in X and $X^a$ include, for example, aliphatic hydrocarbon groups, alicyclic hydrocarbon groups, aromatic hydrocarbon groups, and groups comprising two or more of these groups combined with each other. Examples of the aliphatic hydrocarbon groups are methyl, ethyl, propyl, isopropyl, butyl, isobutyl, s-butyl, t-butyl, pentyl, hexyl, decyl, dodecyl, and other straight- or branched-chain alkyl groups each having about 1 to about 20 carbon atoms, of which those having 1 to 10 carbon atoms are preferred, and those having 1 to 6 carbon atoms are more preferred; vinyl, allyl, 1-butenyl, 3-methyl-4-pentenyl, and other straight- or branched-chain alkenyl groups each having about 2 to about 20 carbon atoms, of which those having 2 to 10 carbon atoms are preferred, and those having 2 to 5 carbon atoms are more preferred; ethynyl, propynyl, 1-butynyl, 2-butynyl, and other straight- or branched-chain alkynyl groups each having about 2 to about 20 carbon atoms, of which those having 2 to 10 carbon atoms are preferred, and those having 2 to 5 carbon atoms are more preferred.

Examples of the alicyclic hydrocarbon groups are monocyclic alicyclic hydrocarbon groups, such as cyclopropyl, cyclobutyl, cyclopentyl, cyclohexyl, cyclooctyl, and other cycloalkyl groups each having about 3 to about 20 members, of which those having 3 to 15 members are preferred, and those having 3 to 12 members are more preferred; cyclopropenyl, cyclobutenyl, cyclopentenyl, cyclohexenyl, and other cycloalkenyl groups each having about 3 to about 20 members, of which those having 3 to 15 members are preferred, and those having 3 to 10 members are more preferred. Examples of the alicyclic hydrocarbon groups also include bridged hydrocarbon groups each having, for example, a bicyclic, tricyclic or tetracyclic hydrocarbon ring such as adamantane ring, perhydroindene ring, decalin ring, perhydrofluorene ring, perhydroanthracene ring, perhydrophenanthrene ring, tricyclo[5.2.1.0$^{2,6}$]decane ring, perhydroacenaphthene ring, perhydrophenalene ring, norbornane ring, and norbornene ring. Examples of the aromatic hydrocarbon groups are phenyl, naphthyl, and other aromatic hydrocarbon groups each having about 6 to about 20 carbon atoms, of which those having 6 to 14 carbon atoms are preferred.

Examples of hydrocarbon groups comprising an aliphatic hydrocarbon group and an alicyclic hydrocarbon group combined with each other include cyclopentylmethyl, cyclohexylmethyl, 2-cyclohexylethyl, other $C_3$–$C_{20}$ cycloalkyl-$C_1$–$C_4$ alkyl groups, and other cycloalkyl-alkyl groups. Examples of hydrocarbon groups comprising an aliphatic hydrocarbon group and an aromatic hydrocarbon group combined with each other include $C_7$–$C_{18}$ aralkyl groups, and other aralkyl groups; and phenyl or naphthyl group substituted with about one to about four $C_1$–$C_4$ alkyl groups, and other alkyl-substituted aryl groups.

These aliphatic hydrocarbon groups, alicyclic hydrocarbon groups, aromatic hydrocarbon groups, and groups comprising these groups combined with each other may each have one or more substituents. Such substituents are not specifically limited, as long as they do not adversely affect the reaction and examples thereof include halogen atoms such as fluorine, chlorine, bromine and iodine atoms; substituted oxy groups including alkoxy groups such as methoxy and ethoxy groups, cycloalkyloxy groups, aryloxy groups, acyloxy groups, and silyloxy groups; substituted oxycarbonyl groups such as alkyloxycarbonyl groups and aryloxycarbonyl groups; acyl groups such as acetyl group and other aliphatic acyl groups, acetoacetyl group, alicyclic acyl groups, and aromatic acyl groups; aliphatic hydrocarbon groups; alicyclic hydrocarbon groups; aromatic hydrocarbon groups; and heterocyclic groups.

The adamantanepolycarboxylic acids and derivatives thereof represented by Formula (1) or (1a) are trifunctional adamantane compounds having three functional groups (carboxyl groups or equivalent groups thereto) at the 1-, 3- and 5-positions of an adamantane skeleton, respectively, when X or $X^a$ is a hydrogen group or a hydrocarbon group; and they are tetrafunctional adamantane compounds having four functional groups (carboxyl groups or equivalent groups thereto) at the 1-, 3-, 5-, and 7-position of the adamantane skeleton, respectively, when X is a carbonyl halide group or a carboxyl group which may be protected by a protecting group or when $X^a$ is a carboxyl group.

In the present invention, X is preferably a hydrogen atom, a $C_1$–$C_6$ alkyl group, a $C_6$–$C_{14}$ aromatic hydrocarbon group or $R^4$, of which $R^4$ is typically preferred as X for higher crosslinking, since the resulting compound is a tetrafunctional adamantane compound. Likewise, $X^a$ is preferably a hydrogen atom, a $C_1$–$C_6$ alkyl group, a $C_6$–$C_{14}$ aromatic hydrocarbon group or a carboxyl group, of which carboxyl group is typically preferred as $X^a$ for higher crosslinking, since the resulting compound is a tetrafunctional adamantane compound.

Examples of the carboxyl-protecting group in $R^1$, $R^2$, $R^3$ and $R^4$ in Formula (1) are alkoxy groups including, for example, $C_1$–$C_{10}$ alkoxy groups such as methoxy, ethoxy, propoxy, isopropoxy, butoxy, isobutoxy, s-butoxy, t-butoxy and hexyloxy groups, and ($C_1$–$C_4$ alkoxy)$_{1-2}$-$C_1$–$C_4$ alkoxy groups such as methoxymethyloxy and methoxyethoxymethyloxy groups; cycloalkyloxy groups including, for example, $C_3$–$C_{20}$ cycloalkyloxy groups such as cyclopentyloxy and cyclohexyloxy groups; tetrahydrofuranyloxy group; tetrahydropyranyloxy group; aryloxy groups including, for example, $C_6$–$C_{20}$ aryloxy groups such as phenoxy and methylphenoxy groups; aralkyloxy groups including, for example, $C_7$–$C_{18}$ aralkyloxy groups such as benzyloxy and diphenylmethyloxy groups; trialkylsilyloxy groups including, for example, tri-$C_1$–$C_4$ alkyl-silyloxy groups such as trimethylsilyloxy and triethylsilyloxy groups; amino groups which may have one or more substituents including, for example, amino group, mono- or di-substituted $C_1$–$C_6$ alkylamino groups such as methylamino, dimethylamino, ethylamino and diethylamino groups, and cyclic amino groups such as pyrrolidino and piperidino groups; hydrazino groups which may have one or more substituents, including, for example, hydrazino group, N-phenylhydrazino group, alkoxycarbonylhydrazino groups including $C_1$–$C_{10}$ alkoxycarbonylhydrazino groups such as t-butoxycarbonyhydrazino group, aralkyloxycarbonylhydrazino group including $C_7$–$C_{18}$ aralkyloxycarbonylhydrazino groups such as benzyloxycarbonylhydrazino group; and acyloxy groups including, for example, $C_1$–$C_{10}$ acyloxy groups such as acetoxy and propionyloxy groups. The carboxyl-protecting group is not limited to the above examples, and other protecting groups conventionally used in the field of organic synthesis can also be used.

Examples of the carbonyl halide groups (haloformyl groups) are carbonyl chloride group, carbonyl bromide group, carbonyl fluoride group, and carbonyl iodide group.

The compounds represented by Formula (1) are mono-, di-, tri- or tetra-esters of adamantanepolycarboxylic acids when $R^1$, $R^2$, $R^3$ and/or $R^4$ is, for example, an alkoxycarbonyl group or aryloxycarbonyl group; they are mono-, di-, tri- or tetra-amides of adamantanepolycarboxylic acids when $R^1$, $R^2$, $R^3$ and/or $R^4$ is a carbamoyl group which may have a substituent; and they are mono-, di-, tri- or tetra-halides of adamantanepolycarboxylic acids when $R^1$, $R^2$, $R^3$ and/or $R^4$ is a carbonyl halide group.

Preferred examples of $R^1$, $R^2$, $R^3$ and $R^4$ are carboxyl group, $C_1$–$C_6$ alkoxy-carbonyl groups, ($C_1$–$C_4$ alkoxy)$_{1-2}$-$C_1$–$C_4$ alkoxy-carbonyl groups, N-substituted carbamoyl groups, tetrahydropyranyloxycarbonyl group, tetrahydrofuranyloxycarbonyl group, aryloxycarbonyl groups, trialkylsilyloxycarbonyl groups, and carbonyl halide groups.

Examples of the aromatic ring corresponding to the bivalent aromatic cyclic groups in $Y^1$, $Y^2$, $Y^3$ and $Y^4$ include monocyclic or polycyclic aromatic hydrocarbon rings and aromatic heterocyclic rings. An example of the monocyclic aromatic hydrocarbon rings is benzene ring. Examples of the polycyclic hydrocarbon rings are naphthalene ring, anthracene ring, phenanthrene ring, phenalene ring, and other rings having a fused ring structure in which two or more aromatic rings commonly possess two or more atoms; and biphenyl ring, biphenylene ring, fluorene ring, and other rings having a structure in which two or more aromatic rings are bound via a linkage group such as a single bond, or an alicyclic ring. Examples of the aromatic heterocyclic rings are monocyclic or polycyclic aromatic heterocyclic rings containing one or more hetero atoms such as oxygen atom, sulfur atom and nitrogen atom. Specific examples of the aromatic heterocyclic rings are furan ring, thiophene ring, pyridine ring, picoline ring, and other monocycles; quinoline ring, isoquinoline ring, acridine ring, phenazine ring, and other polycycles. These aromatic rings may each have one or more substituents. Examples of such substituents are those exemplified as the substituents which the hydrocarbon group in X may have.

Of the adamantanepolycarboxylic acids and derivatives thereof in the present invention, the trifunctional adamantane compounds (adamantanetricarboxylic acid and derivatives thereof) include compounds wherein all the three functional groups are carboxyl groups, compounds wherein one of the three functional groups is a carboxyl group protected by a protecting group (hereinafter briefly referred to as "protected carboxyl group") or a carbonyl halide group; compounds wherein two of the functional groups are each a protected carboxyl group or a carbonyl halide group; and compounds wherein the three functional groups are each a protected carboxyl group or a carbonyl halide group.

Typical examples of the trifunctional adamantane compounds, wherein all the three functional groups are carboxyl groups, include 1,3,5-adamantanetricarboxylic acid, 7-methyl-1,3,5-adamantanetricarboxylic acid, 7-phenyl-1,3,5-adamantanetricarboxylic acid, 1,3,5-tris(4-carboxyphenyl)adamantane, 1,3,5-tris(4-carboxyphenyl)-7-methyladamantane, and 1,3,5-tris(4-carboxyphenyl)-7-phenyladamantane.

Typical examples of the trifunctional adamantane compounds, wherein one of the functional groups is a protected carboxyl group or a carbonyl halide group, are 1-methoxycarbonyl-3,5-adamantanedicarboxylic acid, 1-(t-butoxycarbonyl)-3,5-adamantanedicarboxylic acid, 1-tetrahydropyranyl(THP)oxycarbonyl-3,5-adamantanedicarboxylic acid, 1-phenoxycarbonyl-3,5-adamantanedicarboxylic acid, 1-methoxymethyl(MEM)oxycarbonyl-3,5-adamantanedicarboxylic acid, 1-trimethylsilyl(TMS)oxycarbonyl-3,5-adamantanedicarboxylic acid, 1,3-dicarboxy-5-adamantanecarbonyl chloride, 1-diethylcarbamoyl-3,5-adamantanedicarboxylic acid, 1-pyrrolidinylcarbonyl-3,5-adamantanedicarboxylic acid, and 1,3-bis(4-carboxyphenyl)-5-(4-metoxycarbonylphenyl)adamantane.

Typical examples of the trifunctional adamantane compounds, wherein two of the functional groups are each a protected carboxyl group or a carbonyl halide group, are 1,3-bis(methoxycarbonyl)-5-adamantanemonocarboxylic acid, 1,3-bis(t-butoxycarbonyl)-5-adamantanemonocarboxylic acid, 1,3-bis(tetrahydropyranyl(THP)oxycarbonyl)-5-adamantanemonocarboxylic acid, 1,3-bis(phenoxycarbonyl)-5-adamantanemonocarboxylic acid, 1,3-bis(methoxymethyl(MEM)oxycarbonyl)-5-adamantanemonocarboxylic acid, 1,3-bis(trimethylsilyl(TMS)oxycarbonyl)-5-adamantanemonocarboxylic acid, 1-carboxy-3,5-adamantanedicarbonyl dichloride, 1,3-bis(diethylcarbamoyl)-5-adamantanemonocarboxylic acid, 1,3-bis(1-pyrrolidinylcarbonyl)-5-adamantanemonocarboxylic acid, and 1-(4-carboxyphenyl)-3,5-bis(4-methoxycarbonylphenyl)-adamantane.

Typical examples of the trifunctional adamantane compounds, wherein all the tree functional groups are each a protected carboxyl group or a carbonyl halide group, are 1,3,5-tris(methoxycarbonyl)adamantane, 1,3,5-tris(t-butoxycarbonyl)adamantane, 1,3,5-tris(tetrahydropyranyl(THP)oxycarbonyl)adamantane, 1,3,5-tris(phenoxycarbonyl)adamantane, 1,3,5-tris(methoxymethyl(MEM)oxycarbonyl)adamantane, 1,3,5-tris(trimethylsilyl(TMS)oxycarbonyl)adamantane, 1,3,5-adamantanetricarbonyl trichloride, 1,3,5-tris(diethylcarbamoyl)adamantane, 1,3,5-tris(1-pyrrolidinylcarbonyl)adamantane, and 1,3,5-tris(4-methoxycarbonylphenyl)adamantane.

Of adamantanepolycarboxylic acid and derivatives thereof for use in the present invention, tetrafunctional adamantane compounds (adamantanetetracarboxylic acid and derivatives thereof) include compounds wherein all the four functional groups are carboxyl groups, compounds wherein one of the functional groups is a protected carboxyl group or a carbonyl halide group, compounds wherein two of the functional groups are each a protected carboxyl group or a carbonyl halide group, compounds in which three of the functional groups are each a protected carboxyl group or a carbonyl halide group, and compounds in which all the four functional groups are each a protected carboxyl group or a carbonyl halide group.

Typical examples of the tetrafunctional groups, wherein all the four functional groups are carboxyl groups, are 1,3,5,7-adamantanetetracarboxylic acid and 1,3,5,7-tetrakis (4-carboxyphenyl)adamantane.

Typical examples of the tetrafunctional adamantane compounds, wherein one of the functional groups is a protected carboxyl group or a carbonyl halide group, are 1-methoxycarbonyl-3,5,7-adamantanetricarboxylic acid, 1-(t-butoxycarbonyl)-3,5,7-adamantanetricarboxylic acid, 1-tetrahydropyranyl(THP)oxycarbonyl-3,5,7-adamantanetricarboxylic acid, 1-phenoxycarbonyl-3,5,7-adamantanetricarboxylic acid, 1-methoxymethyl(MEM)oxycarbonyl-3,5,7-adamantanetricarboxylic acid, 1-trimethylsilyl(TMS)oxycarbonyl-3,5,7-adamantanetricarboxylic acid, 1,3,5-tricarboxy-7-adamantanecarbonyl chloride, 1-diethylcarbamoyl-3,5,7-adamantanetricarboxylic acid, 1-(1-pyrrolidinylcarbonyl)-3,5,7-adamantanetricarboxylic acid, and 1,3,5-tris(4-carboxyphenyl)-7-(4-methoxycarbonylphenyl)adamantane.

Typical examples of the tetrafunctional adamantane compounds, wherein two of the functional groups are each a protected carboxyl group or a carbonyl halide group, are 1,3-bis(methoxycarbonyl)-5,7-adamantanedicarboxylic acid, 1,3-bis(t-butoxycarbonyl)-5,7-adamantanedicarboxylic acid, 1,3-bis(tetrahydropyranyl(THP)oxycarbonyl)-5,7-adamantanedicarboxylic acid, 1,3-bis(phenoxycarbonyl)-5,7-adamantanedicarboxylic acid, 1,3-bis(methoxymethyl(MEM)oxycarbonyl)-5,7-adamantanedicarboxylic acid, 1,3-bis(trimethylsilyl(TMS)oxycarbonyl)-5,7-adamantanedicarboxylic acid, 1,3-dicarboxy-5,7-adamantanedicarbonyl dichloride, 1,3-bis(diethylcarbamoyl)-5,7-adamantanedicarboxylic acid, 1,3-bis(1-pyrrolidinylcarbonyl)-5,7-adamantanedicarboxylic acid, and 1,3-bis(4-carboxyphenyl)-5,7-bis(4-methoxycarbonylphenyl)adamantane.

Typical examples of the tetrafunctional adamantane compounds, wherein three of the functional groups are each a protected carboxyl group or a carbonyl halide group, are 1,3,5-tris(methoxycarbonyl)-7-adamantanemonocarboxylic acid, 1,3,5-tris(t-butoxycarbonyl)-7-adamantanemonocarboxylic acid, 1,3,5-tris(tetrahydropyranyl(THP)oxycarbonyl)-7-adamantane monocarboxylic acid, 1,3,5-tris(phenoxycarbonyl)-7-adamantanemonocarboxylic acid, 1,3,5-tris(methoxymethyl(MEM)oxycarbonyl)-7-adamantanemonocarboxylic acid, 1,3,5-tris(trimethylsilyl(TMS)oxycarbonyl)-7-adamantanemonocarboxylic acid, 1-carboxy-3,5,7-adamantanetricarbonyl trichloride, 1,3,5-tris(diethylcarbamoyl)-7-adamantanemonocarboxylic acid, 1,3,5-tris(1-pyrrolidinylcarbonyl)-7-adamantanemonocarboxylic acid, and 1-(4-carboxyphenyl)-3,5,7-tris(4-methoxycarbonylphenyl)adamantane.

Typical examples of the tetrafunctional adamantane compounds, wherein all the four functional groups are each a protected carboxyl group or a carbonyl halide group, are 1,3,5,7-tetrakis(methoxycarbonyl)adamantane, 1,3,5,7-tetrakis(t-butoxycarbonyl)adamantane, 1,3,5,7-tetrakis(tetrahydropyranyl(THP)oxycarbonyl)adamantane, 1,3,5,7-tetrakis(phenoxycarbonyl)adamantane, 1,3,5,7-tetrakis(methoxymethyl(MEM)oxycarbonyl)adamantane, 1,3,5,7-tetrakis(trimethylsilyl(TMS)oxycarbonyl)adamantane, 1,3,5,7-adamantanetetracarbonyl tetrachloride, 1,3,5,7-tetrakis(diethylcarbamoyl)adamantane, 1,3,5,7-tetrakis(1-pyrrolidinylcarbonyl)adamantane, and 1,3,5,7-tetrakis(4-methoxycarbonylphenyl)adamantane.

Each of these adamantanepolycarboxylic acids and adamantanepolycarboxylic acid derivatives can be used alone or in combination, respectively.

The adamantanepolycarboxylic acids represented by Formula (1a) can be prepared according to a known or conventional procedure not specifically limited. For example, an adamantanepolycarboxylic acid of Formula (1a), wherein $Y^1$, $Y^2$, $Y^3$ and $Y^4$ are aromatic rings, can be prepared by the following process. An aromatic compound corresponding to $Y^1$, $Y^2$, $Y^3$ and $Y^4$ is reacted with 1,3,5,7-tetrabromoadamantane by catalysis of $AlCl_3$ to form 1,3,5,7-tetra-aromatic-ring-adamantane; for example, the para-position of the 1,3,5,7-tetra-aromatic-ring adamantane is iodized with iodine; and the resulting 1,3,5,7-tetrakis(iodized aromatic ring-substituted)adamantane is carboxylated in the presence of carbon dioxide by catalysis of, for example, sec-butyllithium, to yield the target compound.

The adamantanepolycarboxylic acid derivatives represented by Formula (1) can be prepared by any process not specifically limited, using a known organic synthesis reaction.

Of the adamantanepolycarboxylic acid derivatives represented by Formula (1), adamantanepolycarboxylic esters can be prepared according to a conventional method for producing carboxylic esters using a carboxylic acid as a raw material, described in, for example, "Experimental Chemistry, New Ed., 14, Syntheses and Reactions of Organic Compounds II" (Maruzen Co., Ltd., Tokyo) or "Protective Groups in Organic Synthesis" (John Wiley & Sons, Inc. NJ). To prepare adamantanepolycarboxylic esters, for example, (i) a reaction between an adamantanepolycarboxylic acid and an alcohol, (ii) a reaction between an adamantanepolycarboxylic acid and an alcohol ester, (iii) a reaction between an adamantanepolycarboxylic acid and an alkene or alkyne, (iv) a reaction between an adamantanepolycarboxylic acid and an O-alkylating agent, or (v) a reaction between adamantanepolycarboxylic acid halide and an alcohol can be used.

Using the reaction (i) between an adamantanepolycarboxylic acid and an alcohol, a target adamantanepolycarboxylic ester can be prepared, for example, by dehydrating the adamantanepolycarboxylic acid and a corresponding alcohol or phenol at room temperature or at an elevated temperature. This reaction can be performed in the presence of an acid catalyst. Examples of the acid catalyst are sulfuric acid, hydrochloric acid, and other inorganic acids; p-toluenesulfonic acid, methanesulfonic acid, and other organic acids; boron fluoride-ether complex, and other Lewis acids; acidic ion-exchange resins, and other resins. The material compounds can be dehydrated, for example, by separating water with a Dean-Stark water separator using a solvent such as toluene; by refluxing a solvent in a Soxhlet extractor containing a desiccating agent such as anhydrous magnesium sulfate or a molecular sieve; or adding a dehydrating agent such as dicyclohexylcarbodiimide (DCC) to the reaction system.

Using the reaction (ii) between an adamantanepolycarboxylic acid and an alcohol ester, a target adamantanepolycarboxylic ester can be prepared, for example, by transesterifying an adamantanepolycarboxylic acid and a corresponding alcohol ester at room temperature or at an elevated temperature. This reaction can be performed in the presence of an acid catalyst and/or a transesterification catalyst. Those exemplified as the acid catalyst in the reaction (i) can be used herein. A by-produced carboxylic acid can be removed, for example, by refluxing a solvent in the presence of a molecular sieve using a Dean-Stark water separator or a Soxhlet extractor.

Using the reaction (iii) between an adamantanepolycarboxylic acid and an alkene or alkyne, a target adamantanepolycarboxylic ester can be prepared, for example, by reacting the adamantanepolycarboxylic acid with the alkene or alkyne in the presence of an acid catalyst at room temperature or at an elevated temperature. Those exemplified as the acid catalyst in the reaction (i) can be used herein. For example, by using isobutene as the alkene, a t-butyl ester of adamantanepolycarboxylic acid can be easily prepared. Likewise, by using dihydropyran, a tetrahydropyranyl ester of adamantanepolycarboxylic acid can be easily prepared.

Using the reaction (iv) between an adamantanepolycarboxylic acid and an O-alkylating agent, a target adamantanepolycarboxylic ester can be prepared, for example, by reacting an adamantanepolycarboxylic acid and a corresponding O-alkylating agent at room temperature or at an elevated temperature. For example, by using diazomethane as the O-alkylating agent, a methyl ester of adamantanepolycarboxylic acid can be easily prepared. Likewise, by using a methoxyethoxymethyl halide, a methoxyethoxymethyl ester of adamantanepolycarboxylic acid can be easily prepared.

Using the reaction (v) between an adamantanepolycarboxylic acid halide and an alcohol, a target adamantanepolycarboxylic ester can be prepared, for example, by reacting the adamantanepolycarboxylic acid halide and an alcohol at room temperature or at an elevated temperature. A base such as pyridine or triethylamine can be incorporated in the reaction system to trap a generated hydrogen halide. An alkoxide prepared by reacting an alcohol with, for example, sodium or an alkyllithium can also be used as the alcohol. The adamantanepolycarboxylic acid halide can be prepared, for example, by halogenating a corresponding adamantanepolycarboxylic acid with thionyl chloride, phosgene, phosphorus trichloride or benzoyl chloride. By using the reaction (v), adamantanepolycarboxylic esters which are unstable against acids, such as t-butyl ester of adamantanepolycarboxylic acid, can be easily prepared.

The adamantanepolycarboxylic amides can be prepared according to a conventional method for producing carboxylic amides using a carboxylic acid as a raw material described in, for example, "Experimental Chemistry, New Ed., 14, Syntheses and Reactions of Organic Compounds II" (Maruzen Co., Ltd., Tokyo) or "Protective Groups in Organic Synthesis" (John Wiley & Sons, Inc. NJ). More specifically, the adamantanecarboxylic amides can be prepared, for example, by using a reaction between an adamantanepolycarboxylic acid and an amine or ammonia, or a reaction between an adamantanepolycarboxylic acid halide and an amine.

Using the reaction between an adamantanepolycarboxylic acid and an amine or ammonia, a target adamantanepolycarboxylic amide can be prepared, for example, by dehydrating the adamantanepolycarboxylic acid and a corresponding amine or ammonia at room temperature or at an elevated temperature. The dehydration can be performed according to the dehydration procedures exemplified in the reaction (i).

Using the reaction between an adamantanepolycarboxylic acid halide and an amine, a target adamantanepolycarboxylic amide can be prepared, for example, by reacting the adamantanepolycarboxylic acid halide and an amine at room temperature or at an elevated temperature. A generated hydrogen halide may be trapped by incorporating a base such as pyridine or triethylamine into the reaction system or by using the material amine in excess. Lithium amide which has been prepared by reacting an amine with, for example, an alkyllithium can also be used as the amine. The Schotten-Baumann method, in which an acid halide is added dropwise to a mixture of an amine and an alkaline aqueous solution, or a method in which the reaction is performed in a dual-layer system comprising an organic solvent and water, can be employed. The adamantanepolycarboxylic acid halide can be prepared according to the procedure described in the reaction (v).

Aromatic Polyamines and Derivatives Thereof

The aromatic polyamines and derivative thereof represented by Formula (2) or (2a) serve as a monomer component constituting the material for dielectric films of the present invention, in addition to the adamantanepolycarboxylic acids and derivatives thereof. The aromatic ring in Ring Z in the formulae includes monocyclic or polycyclic aromatic hydrocarbon rings and aromatic heterocyclic rings. An example of the monocyclic aromatic hydrocarbon rings is benzene ring. Examples of the polycyclic hydrocarbon rings are naphthalene ring, anthracene ring, phenanthrene ring, phenalene ring, and other rings having a fused ring structure in which two or more aromatic rings commonly possess two or more atoms; and biphenyl ring, biphenylene ring, fluorene ring, and other rings having a structure in which two or more aromatic rings are bound via a linkage group such as a single bond, or an alicyclic ring. Examples of the aromatic heterocyclic rings are monocyclic or polycyclic aromatic heterocyclic rings containing one or more hetero atoms such as oxygen atom, sulfur atom and nitrogen atom. Specific examples of the aromatic heterocyclic rings are furan ring, thiophene ring, pyridine ring, picoline ring, and other monocycles; quinoline ring, isoquinoline ring, acridine ring, phenazine ring, and other polycycles. Each of these aromatic rings may have one or more substituents. Such substituents are not specifically limited, as long as they do not adversely affect the reaction. Typical examples of the substituents are halogen atoms such as bromine, chlorine, and fluorine atoms; aliphatic hydrocarbon groups such as methyl, ethyl, propyl, butyl, t-butyl, and other $C_1$–$C_4$ alkyl groups; alicyclic hydrocarbon groups such as cyclohexyl, and other cycloalkyl groups having about 3 to about 15 members; aromatic hydrocarbon groups such as phenyl, benzyl, naphthyl, toluyl group, and other aromatic hydrocarbon groups having about 6 to about 20 carbon atoms, of which those having 6 to 14 carbon atoms are preferred.

Examples of the amino-protecting group in $R^5$ and $R^6$ in Formula (2) are acyl groups such as formyl, acetyl, propionyl, butyryl, isobutyryl, valeryl, pivaloyl, and other $C_1$–$C_6$ aliphatic acyl groups, and benzoyl, naphthoyl, and other aromatic acyl group having about 6 to about 20 carbon atoms; alkoxycarbonyl groups such as methoxycarbonyl, ethoxycarbonyl, t-butoxycarbonyl and other $C_1$–$C_4$ alkoxycarbonyl groups; aralkyloxy-carbonyl groups such as benzyloxycarbonyl, p-methoxybenzyloxycarbonyl, and other $C_7$–$C_{20}$ aralkyloxy-carbonyl groups; and alkylidene groups such as methylidene, ethylidene, propylidene, isopropylidene, butylidene, isobutylidnene, pentylidene, cyclopentylidene, hexylidene, cyclohexylidene, and other aliphatic alkylidene groups, and benzylidene, methylphenylmethylidene, and other aromatic alkylidene groups.

The protected amino groups also include mono-substituted amino groups, as long as they do not adversely affect the reaction for the formation of polybenzazole. Examples of such mono-substituted amino groups are methylamino group, ethylamino group, propylamino group, butylamino group, t-butylamino group, and other alkylamino groups; cyclohexylamino group and other cycloalkylamino groups; phenylamino group and other arylamino groups; benzylamino group and other aralkylamino groups. The amino-protecting group is not limited to the above examples, and other protecting groups conventionally used in the field of organic synthesis can also be used.

The amino-protecting group in $R^7$, $R^8$, $R^9$ and $R^{10}$ can be any of those exemplified as the amino-protecting groups in $R^5$ and $R^6$. A protecting group capable of protecting plural amino groups (polyfunctional protecting group) can also be used as the amino-protecting group. Examples of such polyfunctional protecting groups are carbonyl group, oxalyl group and butane-2,3-diylidene group. By using such a polyfunctional protecting group to protect two of $R^5$, $R^6$, $R^7$ and $R^8$, a ring adjacent to Ring Z is formed. Examples of the hydroxyl-protecting group are alkyl groups such as methyl, ethyl, propyl, isopropyl, butyl, t-butyl, pentyl, hexyl, and other $C_1$–$C_6$ alkyl groups; cycloalkyl groups such as cyclopentyl, cyclohexyl, and other 3- to 15-membered cycloalkyl groups; aralkyl groups such as benzyl, and other $C_7$–$C_{20}$ aralkyl groups; substituted methyl groups such as methoxymethyl, benzyloxymethyl, t-butoxymethyl, 2-methoxyethoxymethyl, and other substituted methyl groups each having a total of about 2 to about 10 carbon atoms; substituted ethyl groups such as 1-ethoxyethyl and 1-methyl-1-methoxyethyl groups; acyl groups such as formyl, acetyl, propionyl, butyryl, isobutyryl, valeryl, pivaloyl, and other $C_1$–$C_{10}$ aliphatic acyl groups, cyclohexylcarbonyl and other $C_4$–$C_{20}$ alicyclic acyl groups, and benzoyl, naphthoyl, and other $C_7$–$C_{20}$ aromatic acyl groups; alkoxycarbonyl groups such as methoxycarbonyl, ethoxycarbonyl, t-butoxycarbonyl, and other $C_1$–$C_4$ alkoxy-carbonyl groups; aralkyloxycarbonyl groups such as benzyloxycarbonyl, p-methoxybenzyloxycarbonyl, and other $C_7$–$C_{20}$ aralkyloxy-carbonyl groups. The mercapto-protecting group can be any of groups exemplified as the hydroxyl-protecting groups.

The substituents $R^7$ and $R^8$ in Ring Z in Formula (2) are preferably positioned at the alpha-position or the beta-position with respect to carbon atoms in Ring Z having $R^5$ and $R^6$, e.g., amino groups which may be protected by a protecting group, respectively. Likewise, the substituents $R^9$ and $R^{10}$ in Ring Z in Formula (2a) are preferably positioned at the alpha-position or the beta-position with respect to carbon atoms in Ring Z having, e.g., —NH$_2$ (amino group), respectively.

For example, by reacting an aromatic polyamine derivative having $R^7$ ($R^8$) at the alpha-position to a carbon atom having $R^5$ ($R^6$) in Ring Z in Formula (2) [or an aromatic polyamine having $R^9$ ($R^{10}$) at the alpha-position to a carbon atom having —NH$_2$ in Ring Z in Formula (2a)] with the adamantanetricarboxylic acid or a derivative thereof, the amino-protecting group and/or carboxyl-protecting group is generally removed to form a 5-membered azole ring. For example, an imidazole ring is formed when $R^7$ is an amino group which may be protected by a protecting group; an oxazole ring is formed when $R^7$ is a hydroxyl group which may be protected by a protecting group; and a thiazole ring is formed when $R^7$ is a mercapto group which may be protected by a protecting group.

By reacting an aromatic polyamine derivative having $R^7$ ($R^8$) at the beta-position to a carbon atom having $R^5$ ($R^6$) in Ring Z in Formula (2) [or an aromatic polyamine having $R^9$ ($R^{10}$) at the beta-position to a carbon atom having —NH$_2$ in Ring Z in Formula (2a)] with the adamantanetricarboxylic acid or a derivative thereof, the amino-protecting group and/or carboxyl-protecting group is generally removed to form a 6-membered nitrogen-containing ring. For example, a hydrodiazine ring is formed when $R^7$ is an amino group or mono-substituted amino group; an oxazine ring is formed when $R^7$ is a hydroxyl group; and a thiazine ring is formed when $R^7$ is a mercapto group.

The positions of $R^5$ and $R^6$ in Ring Z in Formula (2), and those of the amino groups in Ring Z in Formula (2a) are not specifically limited, as long as these groups can be combined with carboxyl groups in the adamantanepolycarboxylic acid to form, for example, a 5- or 6-membered ring together with adjacent carbon atoms, and are preferably such positions that $R^5$ and $R^6$ [or the two amino groups] are not adjacent to each other.

Examples of the aromatic polyamine derivatives represented by Formula (2) are compounds (A) wherein at least one of $R^5$, $R^6$, $R^7$ and $R^8$ is an amino group protected by an alkylidene group (namely, imine derivatives), compounds (B) wherein at least one of $R^5$, $R^6$, $R^7$ and $R^6$ is an acylamino group (namely, amide derivatives), compounds (C) wherein at least one of $R^5$, $R^6$, $R^7$ and $R^8$ is an amino group protected by an alkoxycarbonyl group or aralkyloxycarbonyl group (namely, carbamic ester derivatives), and compounds (D) wherein at least one of $R^5$, $R^6$, $R^7$ and $R^8$ is a mono-substituted amino group.

Typical examples of the aromatic polyamine derivatives (A), (B), (C) and (D) will be illustrated below by taking a compound wherein Ring Z is a benzene ring as an example and by taking a compound having four or two protected groups as an example. However, the aromatic polyamine derivatives are not specifically limited to these examples.

Typical examples of the compounds (imine derivatives) (A), wherein at least one of $R^5$, $R^6$, $R^7$ and $R^8$ is an amino group protected by an alkylidene group, are compounds represented by the following formulae.

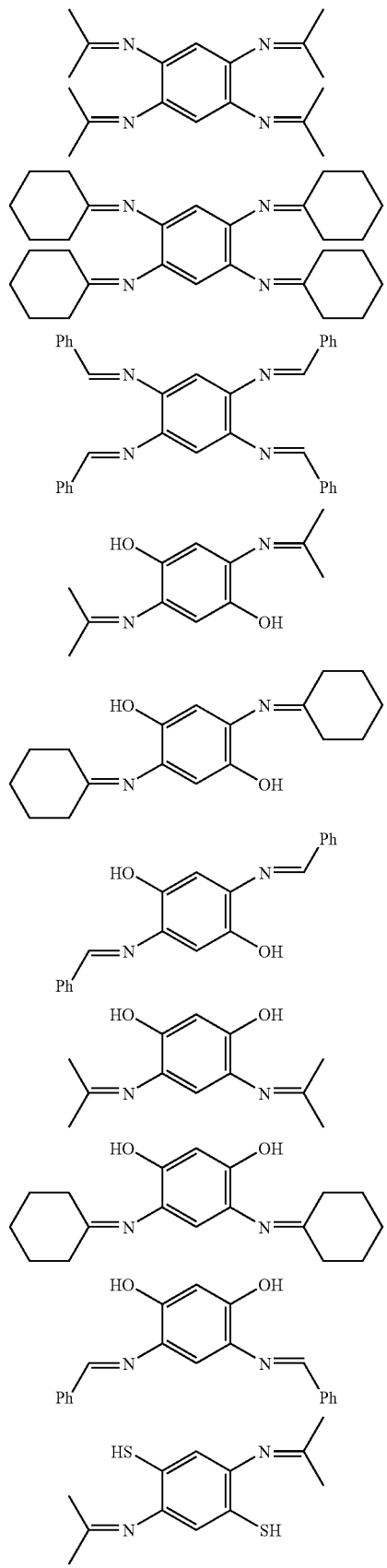

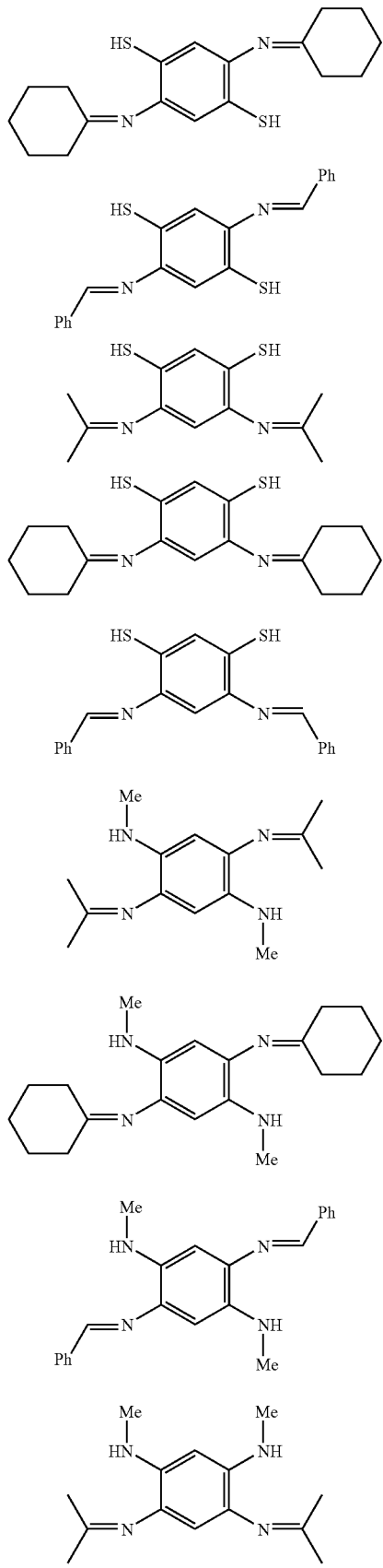
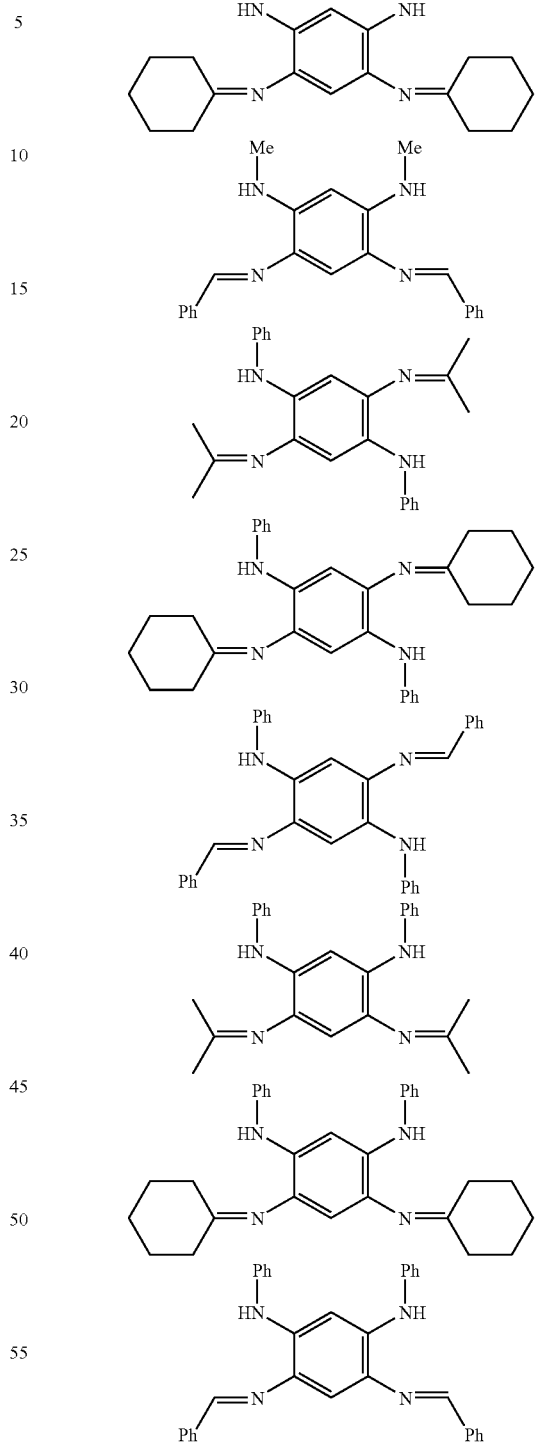

The imine derivatives (A) include, for example, of imine derivatives of Formula (2) wherein $R^5$ and $R^6$ are each an amino group protected by an alkylidene group, those wherein $R^7$ and $R^8$ are each an amino group, such as N,N''-diisopropylidene-1,2,4,5-benzenetetramine, N,N'''-diisopropylidene-1,2,4,5-benzenetetramine, N,N''-dicyclohexylidene-1,2,4,5-benzenetetramine, N,N'''-dicyclohexylidene-1,2,4,5-benzenetetramine, N,N''-dibenzylidene-1,2,4, 5-benzenetetramine, and N,N''''-dibenzylidene-1,2,4,5-benzenetetramine; and those wherein $R^7$ and $R^8$ are each an amino group protected by an alkylidene group, such as N,N',N'',N'''-tetraisopropylidene-1,2,4,5-benzenetetramine, N,N',N'',N'''-tetracyclohexylidene-1,2,4,5-benzenetetramine, and N,N',N'',N'''-tetrabenzylidene-1,2,4,5-benzenetetramine.

The imine derivatives (A) also include, of imine derivatives of Formula (2) wherein $R^5$ and $R^6$ are each an amino group protected by an alkylidene group, those wherein $R^7$ and $R^8$ are each a mono-substituted amino group, such as N,N''-diisopropylidene-N',N'''-dimethyl-1,2,4,5-benzenetetramine, N,N''''-diisopropylidene-N',N''-dimethyl-1,2,4,5-benzenetetramine, N,N''-dicyclohexylidene-N',N'''-dimethyl-1,2,4,5-benzenetetramine, N,N''''-dicyclohexylidene-N',N''-dimethyl-1,2,4,5-benzenetetramine, N,N''-dibenzylidene-N',N'''-dimethyl-1,2,4,5-benzenetetramine, N,N''''-dibenzylidene-N',N''-dimethyl-1,2,4,5-benzenetetramine, N,N''-diisopropylidene-N',N'''-diphenyl-1,2,4,5-benzenetetramine, N,N''''-diisopropylidene-N',N''-diphenyl-1,2,4,5-benzenetetramine, N,N''-dicyclohexylidene-N',N''''-diphenyl-1,2,4,5-benzenetetramine, N,N''''-dicyclohexylidene-N',N''-diphenyl-1,2,4,5-benzenetetramine, N,N''-dibenzylidene-N',N''''-diphenyl-1,2,4,5-benzenetetramine, and N,N''-dibenzylidene-N',N''-diphenyl-1,2,4,5-benzenetetramine.

The imine derivatives (A) also include those wherein $R^7$ and $R^8$ are each a hydroxyl group, such as N,N'-diisopropylidene-2,5-dihydroxy-1,4-benzenediamine, N,N'-diisopropylidene-2,4-dihydroxy-1,5-benzenediamine, N,N'-dicyclohexylidene-2,5-dihydroxy-1,4-benzenediamine, N,N'-dicyclohexylidene-2,4-dihydroxy-1,5-benzenediamine, N,N'-dibenzylidene-2,5-dihydroxy-1,4-benzenediamine, and N,N'-dibenzylidene-2,4-dihydroxy-1,5-benzenediamine; and those wherein $R^7$ and $R^8$ are each a mercapto group, such as N,N'-diisopropylidene-2,5-dimercapto-1,4-benzenediamine, N,N'-diisopropylidene-2,4-dimercapto-1,5-benzenediamine, N,N'-dicyclohexylidene-2,5-dimercapto-1,4-benzenediamine, N,N'-dicyclohexylidene-2,4-dimercapto-1,5-benzenediamine, N,N'-dibenzylidene-2,5-dimercapto-1,4-benzenediamine, and N,N'-dibenzylidene-2,4-dimercapto-1,5-benzenediamine.

Examples of the compounds (amide derivatives) (B) wherein at least one of $R^5$, $R^6$, $R^7$ and $R^7$ is an acylamino group are compounds represented by the following formulae.

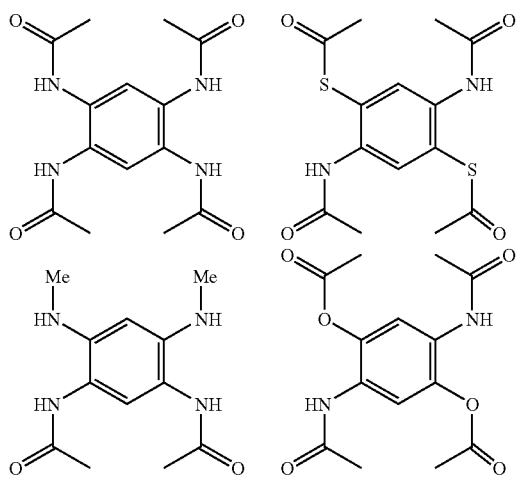

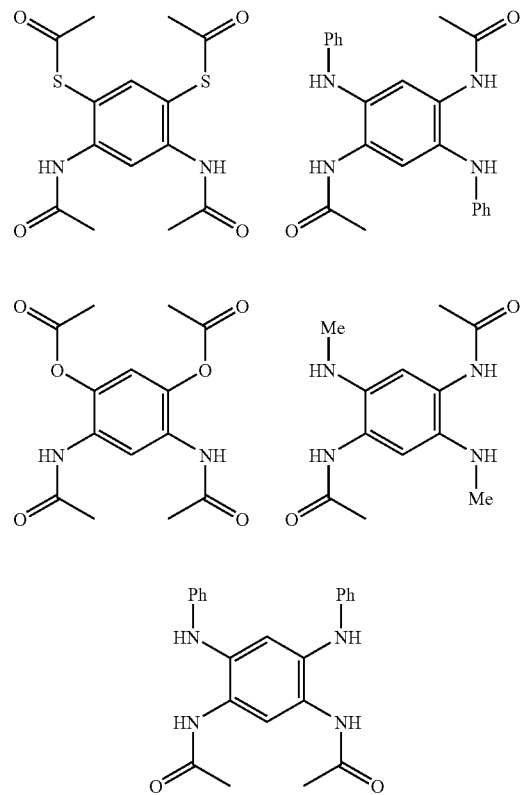

The amide derivatives (B) include, for example, of amide derivatives of Formula (2) wherein $R^5$ and $R^6$ are each an acylamino group, those wherein $R^7$ and $R^8$ are each an acylamino group, such as 1,2,4,5-tetrakis(acetamino)benzene; those wherein $R^7$ and $R^8$ are each a mono-substituted amino group, such as 1,4-bis(acetamino)-2,5-bis(methylamino)benzene, 1,5-bis(acetamino)-2,4-bis(methylamino)benzene, 1,4-bis(acetamino)-2,5-bis(phenylamino)benzene, and 1,5-bis(acetamino)-2,4-bis(phenylamino)benzene; those wherein $R^7$ and $R^8$ are each a protected hydroxyl group, such as 1,4-bis(acetamino)-2,5-diacetoxybenzene, and 1,5-bis(acetamino)-2,4-diacetoxybenzene; those wherein $R^7$ and $R^8$ are each a protected mercapto group, such as 1,4-bis(acetamino)-2,5-diacetylthiobenzene and 1,5-bis(acetamino)-2,4-diacetylthiobenzene.

Examples of the compounds (carbamic ester derivatives) (C) wherein at least one of $R^5$, $R^6$, $R^7$ and $R^8$ is an amino group protected by an alkoxycarbonyl group or aralkyloxycarbonyl group are compounds represented by the following formulae.

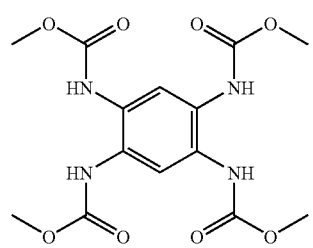

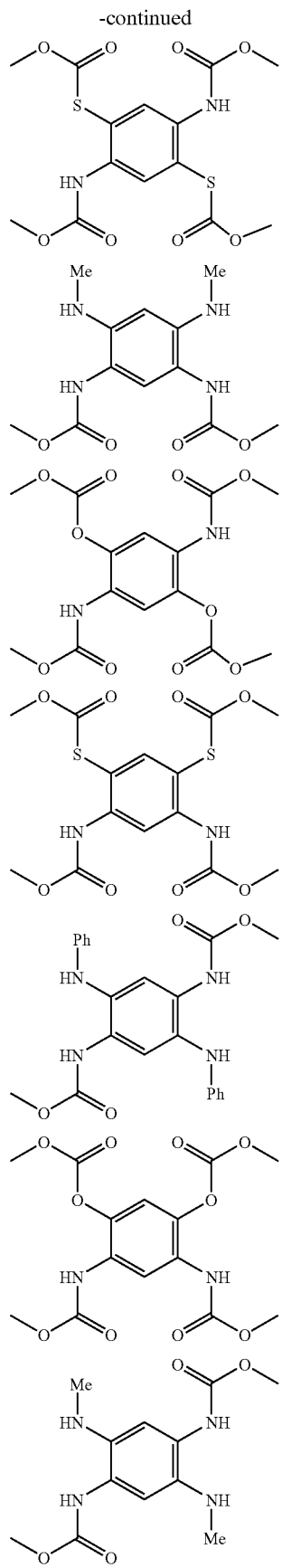

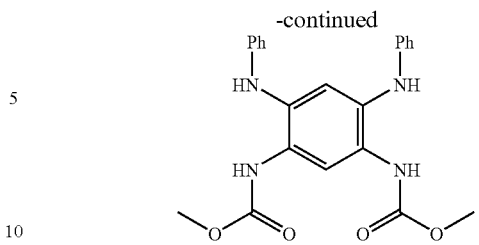

The carbamic ester derivatives (C) include, of carbamic ester derivatives of Formula (2) wherein $R^5$ and $R^6$ are each an amino group protected by an alkoxycarbonyl group, those wherein $R^7$ and $R^8$ are each an amino group protected by an alkoxycarbonyl group, such as 1,2,4,5-tetrakis(methoxycarbonylamino)benzene; those wherein $R^7$ and $R^8$ are each a mono-substituted amino group, such as 1,4-bis(methoxycarbonylamino)-2,5-bis(methylamino)benzene, 1,5-bis(methoxycarbonylamino)-2,4-bis(methylamino)benzene, 1,4-bis(methoxycarbonylamino)-2,5-bis(phenylamino)benzene, and 1,5-bis(methoxycarbonylamino)-2,4-bis(phenylamino)benzene; those wherein $R^7$ and $R^8$ are each a protected hydroxyl group, such as 1,4-bis(methoxycarbonylamino)-2,5-dimethoxycarbonyloxybenzene and 1,5-bis(methoxycarbonylamino)-2,4-dimethoxycarbonyloxybenzene; those wherein $R^7$ and $R^8$ are each a protected mercapto group, such as 1,4-bis(methoxycarbonylamino)-2,5-dimethoxycarbonylthiobenzene and 1,5-bis(methoxycarbonylamino)-2,4-dimethoxycarbonylthiobenzene.

Typical examples of compounds (D) wherein at least one of $R^5$, $R^6$, $R^7$ and $R^8$ is a mono-substituted amino group are, of compounds of Formula (2) wherein $R^5$ and $R^6$ are each a mono-substituted amino group, those wherein $R^7$ and $R^8$ are each a mono-substituted amino group, such as 1,2,4,5-tetrakis(methylamino)benzene and 1,2,4,5-tetrakis(phenylamino)benzene; and those wherein $R^7$ and $R^8$ are each an amino group, such as 1,4-diamino-2,5-bis(methylamino)benzene, 1,5-diamino-2,4-bis(methylamino)benzene, 1,4-diamino-2,5-bis(phenylamino)benzene, and 1,5-diamino-2,4-bis(phenylamino)benzene.

The aromatic polyamine derivatives represented by Formula (2) also include compounds wherein at least two of $R^5$, $R^6$, $R^7$ and $R^8$ are combined to form a ring, such as compounds wherein amino groups in the molecule are protected by the protecting group capable of protecting plural amino groups (polyfunctional protecting group). Typical examples of such compounds are a compound corresponding to 1,2,4,5-tetraminobenzene, except with two oxalyl groups protecting the amino groups thereof [i.e., a compound of Formula (2) wherein Ring Z is a benzene ring; and $R^5$ and $R^7$, and $R^6$ and $R^8$ are amino groups protected by an oxalyl group, respectively], a compound corresponding to 1,2,4,5-tetraminobenzene, except with two butane-2,3-diylidene groups protecting the amino groups thereof [i.e., a compound of Formula (2) wherein Ring Z is a benzene ring; and $R^5$ and $R^7$, and $R^6$ and $R^8$ are amino groups protected by a butane-2,3-diylidene group, respectively].

Typical examples of the aromatic polyamines represented by Formula (2a) are 1,2,4,5-tetraminobenzene, 1,4-diamino-2,5-dihydroxybenzene, 1,5-diamino-2,4-dihydroxybenzene, 1,4-diamino-2,5-dimercaptobenzene, and 1,5-diamino-2,4-dimercaptobenzene.

Each of these aromatic polyamines and aromatic polyamine derivatives can be used alone or in combination, respectively.

The aromatic polyamines and derivatives thereof represented by Formula (2) or (2a) can be prepared according to a known or conventional procedure or by using a known organic synthesis reaction.

For example, an amide derivative of an aromatic polyamine can be prepared by a process for introducing a protecting group into an amine such as a conventional synthesis method for carboxylic amides using an amine as a material described in, for example, "Experimental Chemistry, New Ed., 14, Syntheses and Reactions of Organic Compounds II" (Maruzen Co., Ltd., Tokyo) or "Protective Groups in Organic Synthesis" (John Wiley & Sons, Inc. NJ). For example, a carboxylic amide of an aromatic polyamine can be prepared by using a reaction (I) of an aromatic polyamine with a carboxylic acid, a reaction (II) with an anhydride of a carboxylic acid or a reaction (III) with a carbonyl halide.

Using the reaction (I) between an aromatic polyamine and a carboxylic acid, a target carboxylic amide can be prepared, for example, by dehydrating the aromatic polyamine and a corresponding carboxylic acid at room temperature or at an elevated temperature. The material compounds can be dehydrated, for example, by separating water with a Dean-Stark water separator using a solvent such as toluene; by refluxing a solvent in a Soxhlet extractor containing a desiccating agent such as anhydrous magnesium sulfate or a molecular sieve; or adding a dehydrating agent such as dicyclohexylcarbodiimide (DCC) to the reaction system.

Using the reaction (II) between an aromatic polyamine and a carboxylic anhydride, a target carboxylic amide can be prepared, for example, by reacting the aromatic polyamine and a corresponding carboxylic anhydride at room temperature or at an elevated temperature. This reaction can be performed in the presence of a catalyst. Such catalysts include acid catalysts such as sulfuric acid, hydrochloric acid, and other inorganic acids; acetic acid, p-toluenesulfonic acid, methanesulfonic acid, and other organic acids, boron fluoride-ether complex and other Lewis acids; acidic ion-exchange resins, and other resins, as well as base catalysts such as pyridine, triethylamine, and N,N-bis(methylamino)pyridine.

Using the reaction (III) between an aromatic polyamine and a carbonyl halide, a target carboxylic amide can be prepared, for example, by reacting the aromatic polyamine and a corresponding carbonyl halide at room temperature or at an elevated temperature. A generated hydrogen halide may be trapped by incorporating a base such as pyridine or triethylamine into the reaction system or by using the material amine in excess. Lithium amide which has been prepared by reacting an amine with, for example, an alkyllithium can also be used as the amine. The Schotten-Baumann method, in which an acid halide is added dropwise to a mixture of an amine and an alkaline aqueous solution, or a method in which the reaction is performed in a dual-layer system comprising an organic solvent and water, can be employed.

An imine derivative of an aromatic polyamine can be prepared, for example, by a process using an imidization reaction using an amine as a material described in "Experimental Chemistry, New Ed., 14, Syntheses and Reactions of Organic Compounds III" (Maruzen Co., Ltd., Tokyo) or "Protective Groups in Organic Synthesis" (John Wiley & Sons, Inc. NJ). More specifically, the target imine-type aromatic polyamine can be prepared, for example, by dehydrating the aromatic polyamine and a corresponding ketone or aldehyde at room temperature or at an elevated temperature. This reaction can be performed in the presence of an acid catalyst. Any of the acid catalysts described in the reaction (II) and any of dehydration procedures described in the reaction (I) can be used herein.

Other Components

The material for dielectric films (hereinafter may be referred to as "material composition") may further comprise other components in addition to the above components. For example, the material composition may further comprise a catalyst for accelerating the polymerization reaction. Typical examples of the catalyst are sulfuric acid, methanesulfonic acid, p-toluenesulfonic acid, and other acid catalysts. The amount of the catalyst is, for example, from about 0% by mole to about 10% by mole, and preferably from about 0% by mole to about 5% by mole relative to the total amount of the monomer components (the adamantanepolycarboxylic acid and aromatic polyamine). The material composition may comprise a thickening agent (bodying agent) for increasing the viscosity of the resulting composition as a solution. Typical examples of the thickening agent are ethylene glycol, diethylene glycol, triethylene glycol, polyethylene glycol, and other alkylene glycols and polyalkylene glycols. The amount of the thickening agent is, for example, from about 0% by weight to about 20% by weight, and preferably from about 0% by weight to about 10% by weight based on the total amount of the material composition (coating liquid). The material composition may also comprise a monocarboxylic acid for adjusting the molecular weight of the resulting polymer, and/or a dicarboxylic acid for adjusting the degree of crosslinking of the polymer. Typical examples of the monocarboxylic acid are adamantanecarboxylic acid, benzoic acid, and other monocarboxylic acids; and methyl adamantanecarboxylate, methyl benzoate, and other monocarboxylic acid derivatives. Typical examples of the dicarboxylic acid are adamantanedicarboxylic acid, terephthalic acid, and other dicarboxylic acids; and dimethyl adamantanedicarboxylate, dimethyl terephthalate, and other dicarboxylic acid derivatives. The amount of the monocarboxylic acid is, for example, from about 0% by mole to about 10% by mole, and preferably from about 0% by mole to about 5% by mole relative to the adamantanepolycarboxylic acid. The amount of the dicarboxylic acid is, for example, from about 0% by mole to about 100% by mole, and preferably from about 0% by mole to about 50% by mole relative to the adamantanepolycarboxylic acid.

The material composition may contain an adhesion promoter for increasing the adhesion of the resulting dielectric film to a substrate. Typical examples of the adhesion promoter is trimethoxyvinylsilane, hexamethyldisilazane, γ-aminopropyltriethoxysilane, and aluminum monoethylacetoacetate diisopropylate. The amount of the adhesion promoter is, for example, from about 0% by weight to about 10% by weight, and preferably from about 0% by weight to about 5% by weight relative to the total amount of the monomer components.

Solvents

Solvents for use in the present invention are not specifically limited, as long as they do not adversely affect the cyclization reaction between the adamantanepolycarboxylic acid or its derivative (hereinafter briefly referred to as "adamantanepolycarboxylic acid") and the aromatic polyamine or its derivative (hereinafter briefly referred to as "aromatic polyamine"). Examples of such solvents are aliphatic hydrocarbons such as hexane, heptane and octane; alicyclic hydrocarbons such as cyclohexane and methylcyclohexane; aromatic hydrocarbons such as benzene, toluene, xylene, ethylbenzene and mesitylene; halogenated hydrocarbons such as dichloromethane, dichloroethane, chloroform and carbon tetrachloride; alcohols such as methanol, ethanol, propanol, butanol and ethylene glycol; ethers such as dioxane, tetrahydrofuran, diethyl ether and propylene glycol monomethyl ether (PGME); esters such as formic esters, acetic esters, propionic esters, benzoic esters, γ-butyrolactone and propylene glycol monomethyl ether acetate (PGMEA); ketones such as acetone, methyl ethyl ketone, diethyl ketone, methyl isobutyl ketone, cyclopentanone and cyclohexanone; carboxylic acids such as formic acid, acetic acid, propionic acid and butyric acid; aprotic polar solvents including nitrites such as acetonitrile, propionitrile and benzonitrile, amides such as formamide, dimethylformamide, acetamide, dimethylacetamide and N-methylpyrrolidone, and sulfoxides such as dimethyl sulfoxide. Each of these solvents can be used alone or in combination.

The polymerizable composition as the material for dielectric films (material composition) can be prepared according to any procedure, as long as the adamantanepolycarboxylic acid and the aromatic polyamine (monomer components) can be completely dissolved in the solvent. For example, it can be prepared by stirring or leaving stand a mixture comprising the monomer components, the solvent, and other components. The ratio of the adamantanepolycarboxylic acid to the aromatic polyamine can be set freely depending on the solubility in the solvent, as long as the functions of the resulting dielectric film are not adversely affected. The molar ratio of the adamantanepolycarboxylic acid to the aromatic polyamine is preferably from about 10:90 to about 60:40, and more preferably from about 20:80 to about 50:50.

The total concentration of the adamantanepolycarboxylic acid and the aromatic polyamine (total monomer concentration) in the solvent can be arbitrarily set depending on the solubility in the solvent and is, for example, from about 5% by weight to about 70% by weight, and preferably from about 10% by weight to about 60% by weight. The material for dielectric films of the present invention uses at least one derivative among the adamantane polycarboxylic acid and the aromatic polyamine as a monomer component, has increased solubility in a solvent, and contains monomer components in a high concentration. A dielectric film formed from the material composition containing the monomer components in a high concentration can have an increased thickness, have excellent electric properties and have such a thickness that can support various semiconductor fabrication processes.

The components may be dissolved in the solvent in any atmosphere such as air atmosphere, as long as the aromatic polyamine is not oxidized, but preferably in an atmosphere of inert gas such as nitrogen or argon gas. The temperature for dissolution is not specifically limited and, where necessary, the composition may be heated depending on the solubility of the monomer components and the boiling point of the solvent. The temperature for dissolution is, for example, from about 0° C. to 200° C., and preferably from about 10° C. to about 150° C.

To form a dielectric film exhibiting high heat resistance due to its high degree of crosslinking, a possible material is a polycondensed product (polybenzazole) of an adamantanepolycarboxylic acid and an aromatic polyamine. However, such a polycondensed polybenzazole has a high degree of crosslinking, thereby has a low solubility in solvent and cannot be significantly used as a material for forming a thin dielectric film by coating. In contrast, the material composition of the present invention containing the monomer components completely dissolved in the solvent can be applied to a substrate as intact as a coating liquid. The applied film is then polymerized to thereby easily form a dielectric film comprising a highly crosslinked polybenzazole.

The dielectric film of the present invention comprises a polymer (high-molecular-weight crosslinked product) formed from the adamantanepolycarboxylic acid and the aromatic polyamine. The dielectric film can be prepared, for example, by applying the polymerizable material composition to a substrate and polymerizing the applied film by heating. Examples of the substrate are silicon wafers, metal substrates, and ceramic substrates. The material composition can be applied according to a conventional procedure not specifically limited, such as spin coating, dip coating or spray coating.

The heating can be performed at any temperature, as long as the polymerizable components can be polymerized, and is performed at a temperature, for example, from about 100° C. to about 500° C., and preferably from about 150° C. to about 450° C. at a constant temperature or with a stepwise temperature gradient. The heating can be performed in any atmosphere such as air atmosphere, as long as the properties of the resulting thin film are not adversely affected, but preferably in an atmosphere of inert gas such as nitrogen or argon gas, or in vacuo.

As a result of heating, the polycondensation reaction between the adamantanepolycarboxylic acid and the aromatic polyamine in the material composition proceeds generally along with deprotection of the carboxyl-protecting groups and/or amino-protecting groups to form a polybenzazole (imidazole, oxazole or thiazole) having an adamantane skeleton as a polymer (high-molecular-weight crosslinked product).

The dielectric film comprises a polymer formed from the material composition and has an adamantane ring, aromatic ring, and thiazole ring or 6-membered nitrogen-containing ring (a ring formed in a polycondensed moiety) as main constitutional units. For example, by using an adamantanepolycarboxylic acid having three functional groups, a highly crosslinked polymer film can be formed, in which the adamantane compound having a three-dimensional structure and the aromatic polyamine having a two-dimensional structure are combined to form a structure having crosslinks in three directions with the adamantane skeleton as vertexes (crosslinking points). That is, the film has a unit in which three hexagons commonly possess two vertexes or two sides. By using an adamantanepolycarboxylic acid having four functional groups, a net polymer film can be formed, in which crosslinks are formed in four directions with the adamantane skeleton as vertexes (crosslinking points). That is, the film has a unit in which three hexagons commonly possess two sides. Thus, the dielectric film involves a multitude of uniformly dispersed molecular-scale voids and can have a satisfactorily low relative dielectric constant.

The thickness of the dielectric film formed by heating is, for example, about 50 nm or more (e.g., from about 50 to about 2000 nm), preferably about 100 nm or more (e.g., from about 100 to about 2000 nm), and more preferably about 300 nm or more (e.g., from about 300 to about 2000 nm). Using the material composition, a coating liquid containing the monomer components in a high concentration can be prepared to thereby form a film having the aforementioned thickness even it is a dielectric film comprising a polybenzazole. If the thickness is less than about 50 nm, leak current may occur, electric properties may be adversely affected, or the resulting film may not be satisfactorily smoothened by chemical-mechanical polishing (CMP) in a semiconductor fabrication process. Accordingly, such a film having an excessively small thickness is not suitable as an interlayer dielectric.

The dielectric films of the present invention can have a low dielectric constant and high heat resistance, are usable, for example, as a dielectric coating in electronic material parts such as semiconductor devices and are particularly useful as an interlayer dielectric.

The present invention will be illustrated in further detail with reference to several examples and comparative examples below, which are not intended to limit the scope of the invention. The symbols "s", "m" and "w" in infrared absorption spectral data mean absorption intensity of a wavelength indicated prior to each symbol, and means that the absorption is "strong", "medium" or "weak", respectively. The thickness of polymer films was determined with an ellipsometer.

PREPARATION EXAMPLE 1

Preparation of trimethyl ester of 1,3,5-adamantanetricarboxylic acid

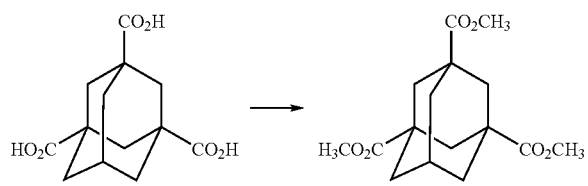

In a 200-ml flask equipped with a stirrer, a condenser and a thermometer were placed 26.8 g (100 mmol) of 1,3,5-adamantanetricarboxylic acid, 100 ml of methanol and 0.49 g (5 mmol) of sulfuric acid, followed by heating under reflux in a nitrogen atmosphere for 3 hours. After cooling to room temperature, methanol was removed under reduced pressure, and the reaction mixture was dissolved in ethyl acetate. The solution was washed with 10% aqueous solution of sodium carbonate and water to remove a residual acid component. Ethyl acetate was removed from the ethyl acetate solution under reduced pressure to yield 27.3 g (88 mmol) of trimethyl ester of 1,3,5-adamantanetricarboxylic acid in a yield of 88%.

[NMR Spectral Data]
$^1$H-NMR (CDCl$_3$) δ (ppm): 1.84 (m, 6H), 2.01 (m, 6H), 2.30 (m, 1H), 3.65 (m, 9H)
$^{13}$C-NMR (CDCl$_3$) δ (ppm): 27.86, 37.06, 39.11, 41.28, 51.91, 176.40

PREPARATION EXAMPLE 2

Preparation of 1,3,5-adamantanetricarbonyl trichloride

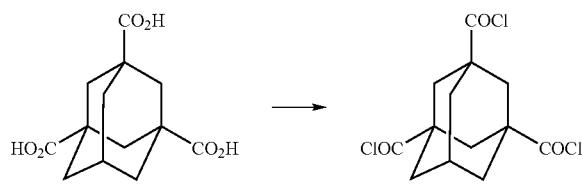

In a 200-ml flask equipped with a stirrer, a condenser, a thermometer and an acidic gas trap were placed and stirred 26.8 g (100 mmol) of 1,3,5-adamantanetricarboxylic acid and 59.5 g (500 mmol) of thionyl chloride. To the mixture was added dropwise 0.37 g (5 mmol) of dimethylformamide (DMF) at room temperature, and the mixture was gradually heated and stirred at 70° C. in a nitrogen atmosphere for 3 hours. After cooling to room temperature, the residual thionyl chloride and DMF were removed under reduced pressure, to yield 31.4 g (97 mmol) of 1,3,5-adamantanetricarbonyl trichloride in a yield of 97%.

[NMR Spectral Data]
$^1$H-NMR (CDCl$_3$) δ (ppm): 1.74 (m, 6H), 1.95 (m, 6H), 2.33 (m, 1H)
$^{13}$C-NMR (CDCl$_3$) δ (ppm): 27.70, 36.52, 39.89, 51.21, 178.63

PREPARATION EXAMPLE 3

Preparation of tri-tert-butyl ester of 1,3,5-adamantanetricarboxylic acid

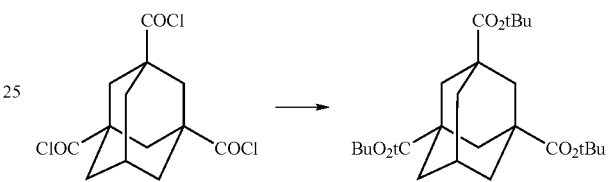

In a 500-ml flask equipped with a stirrer, a thermometer and a dropping funnel were placed 32.6 g (340 mmol) of sodium tert-butoxide and 140 ml of toluene. To the stirred mixture under ice-cooling in a nitrogen atmosphere, 31.4 g (97 mmol) of 1,3,5-adamantanetricarbonyl trichloride in 190 ml of toluene was added dropwise over 1 hour. This was warmed to room temperature, was stirred for further 1 hour and was washed with water, followed by removal of the solvent under reduced pressure. The residue was mixed with methanol and was further mixed with water with stirring under ice-cooling, to yield crystals of the target compound. The crystals were collected by filtration through a Nutsche funnel, were rinsed with a mixture of distilled water and methanol and were dried, to yield 38.1 g (87 mmol) of tri-tert-butyl ester of 1,3,5-adamantanetricarboxylic acid in a yield of 90%.

[NMR Spectral Data]
$^1$H-NMR (CDCl$_3$) δ (ppm): 1.43 (s, 27H), 1.85 (m, 6H), 2.03 (m, 6H), 2.31 (m, 1H)
$^{13}$C-NMR (CDCl$_3$) δ (ppm): 27.90, 28.02, 37.11, 39.16, 41.32, 79.73, 176.44

PREPARATION EXAMPLE 4

Preparation of tris(methoxyethyl)ester of 1,3,5-adamantanetricarboxylic acid

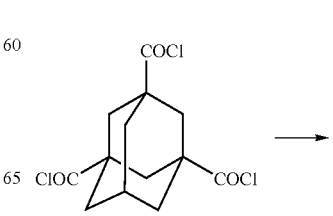

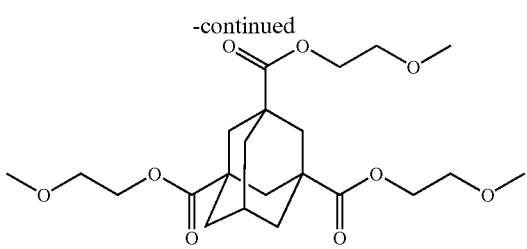

In a 500-ml flask equipped with a stirrer, a thermometer and a dropping funnel were placed 36.9 g (485 mmol) of 2-methoxyethanol, 38.4 g (485 mmol) of pyridine and 140 ml of toluene. To the stirred mixture under ice-cooling in a nitrogen atmosphere, 31.4 g (97 mmol) of 1,3,5-adamantanetricarbonyl trichloride in 190 ml of toluene was added dropwise over 1 hour. This was warmed to room temperature, was stirred for further 1 hour and was washed with water, 1 N hydrochloric acid, and 10% aqueous sodium carbonate solution, and the solvent was removed under reduced pressure, to yield 38.5 g (87 mmol) of tris(methoxyethyl)ester of 1,3,5-adamantanetricarboxylic acid in a yield of 90%.

[NMR Spectral Data]
$^1$H-NMR (CDCl$_3$) δ (ppm): 1.86 (m, 6H), 2.05 (m, 6H), 2.30 (m, 1H), 3.38 (s, 9H), 3.59 (m, 6H), 4.23 (m, 6H)
$^{13}$C-NMR (CDCl$_3$) δ (ppm): 27.84, 36.97, 38.93, 41.33, 58.97, 63.64, 70.39, 175.90

PREPARATION EXAMPLE 5

Preparation of 1,3,5-tris(1-pyrrolidinylcarbonyl)adamantane

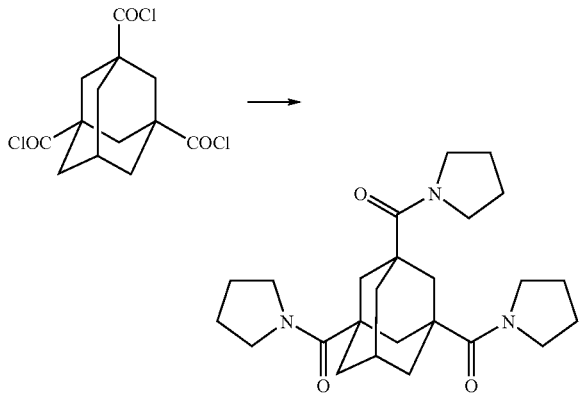

In a 500-ml flask equipped with a stirrer, a thermometer and a dropping funnel were placed 34.5 g (485 mmol) of pyrrolidine, 38.4 g (485 mmol) of pyridine and 140 ml of methylene chloride. To the stirred mixture under ice-cooling in a nitrogen atmosphere, 31.4 g (97 mmol) of 1,3,5-adamantanetricarbonyl trichloride in 190 ml of methylene chloride was added dropwise over 1 hour. This was warmed to room temperature, was stirred for further 1 hour and was washed with water, 1 N hydrochloric acid, and 10% aqueous sodium carbonate solution, and the solvent was removed under reduced pressure, to yield 37.2 g (87 mmol) of 1,3,5-tris(1-pyrrolidinylcarbonyl)adamantane in a yield of 90%.

Infrared absorption spectral data (cm$^{-1}$):
2900, 1620, 1450, 1370, 1160, 1050
MS: 428 (M+H)

PREPARATION EXAMPLE 6

Preparation of 1,3,5-adamantanetricarboxylic acid N,N-diethylamide [1,3,5-tris(N,N-diethylcarbamoyl)adamantane]

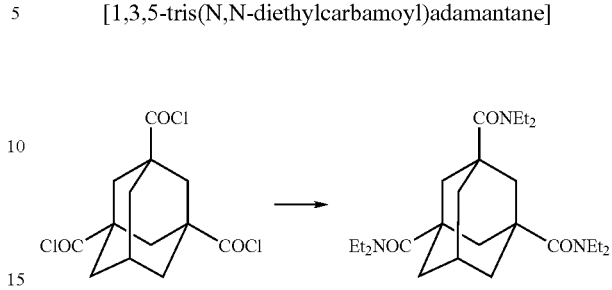

In a 500-ml flask equipped with a stirrer, a thermometer and a dropping funnel were placed 35.5 g (485 mmol) of diethylamine, 38.4 g (485 mmol) of pyridine and 140 ml of methylene chloride. To the stirred mixture under ice-cooling in a nitrogen atmosphere, 31.4 g (97 mmol) of 1,3,5-adamantanetricarbonyl trichloride in 190 ml of methylene chloride was added dropwise over 1 hour. This was warmed to room temperature, was stirred for further 1 hour and was washed with water, 1 N hydrochloric acid, and 10% aqueous sodium carbonate solution, and the solvent was removed under reduced pressure, to yield 35.8 g (82 mmol) of 1,3,5-adamantanetricarboxylic acid N,N-diethylamide in a yield of 85%.

Infrared absorption spectral data (cm$^{-1}$):
2900, 1620, 1450, 1370, 1160, 1050
MS: 434 (M+H)

PREPARATION EXAMPLE 7

Preparation of 3,3'-diaminobenzidine tetracyclohexanimine [N,N',N'',N'''-tetracyclohexylidene-3,4,3',4'-biphenyltetramine]

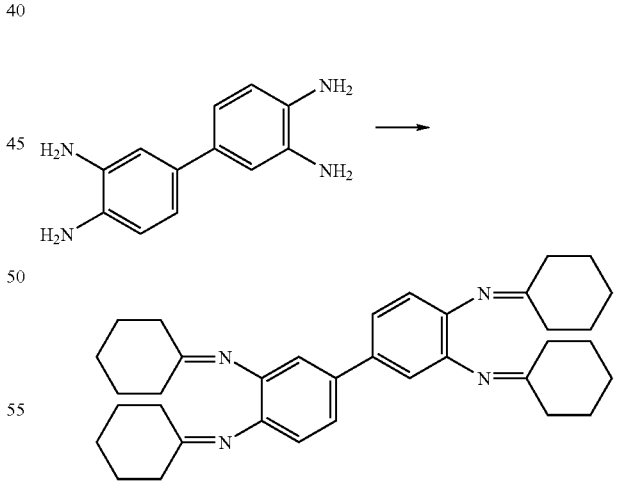

In a 200-ml flask equipped with a stirrer, a condenser and a thermometer were placed 21.4 g (100 mmol) of 3,3'-diaminobenzidine and 100 ml of cyclohexanone, followed by heating with stirring at 60° C. in a nitrogen atmosphere for 2 hours. After cooling to room temperature, cyclohexanone was removed under reduced pressure. The residue was purified by silica gel chromatography, to yield 48.1 g (90 mmol) of the target 3,3'-diaminobenzidine tetracyclohexanimine [N,N',N'',N'''-tetracyclohexylidene-3,4,3',4'-biphenyltetramine] in a yield of 90%.

Infrared absorption spectral data (cm$^{-1}$):
1636 (C=N)
MS: 535 (M+H), 491, 453

PREPARATION EXAMPLE 8

Preparation of 3,3'-diaminobenzidine tetraisopropanimine[N,N',N'',N'''-tetraisopropylidene-3,4,3',4'-biphenyltetramine]

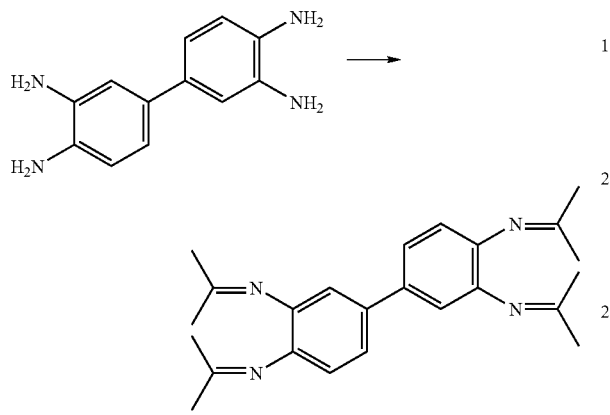

In a 200-ml flask equipped with a Soxhlet extractor including molecular sieves 4A as a dehydrating agent, a stirrer, a condenser and a thermometer were placed 21.4 g (100 mmol) of 3,3'-diaminobenzidine, 100 ml of acetone and 0.95 g (5 mmol) of p-toluenesulfonic acid monohydrate, followed by heating under reflux in a nitrogen atmosphere for 3 hours. After cooling to room temperature, acetone was removed under reduced pressure, and the residue was dissolved in ethyl acetate. The solution was washed with water and 10% aqueous sodium carbonate solution to remove a residual acid component. Ethyl acetate was removed from the solution under reduced pressure, and the residue was purified by silica gel chromatography to yield 28.5 g (76 mmol) of the target 3,3'-diaminobenzidine tetraisopropanimine [N,N',N'',N'''-tetraisopropylidene-3,4,3',4'-biphenyltetramine] in a yield of 76%.

Infrared absorption spectral data (cm$^{-1}$):
1627 (C=N)
MS: 375 (M+H), 359, 333, 324

PREPARATION EXAMPLE 9

Preparation of 3,3'-diaminobenzidine monoisopropanimine [N'-isopropylidene-3,4,3',4'-biphenyltetramine] and 3,3'-diaminobenzidine diisopropanimine [N',N'''-diisopropylidene-3,4,3',4'-biphenyltetramine]

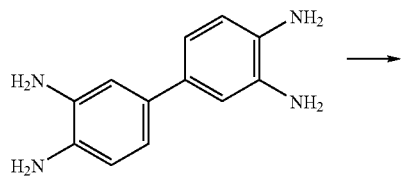

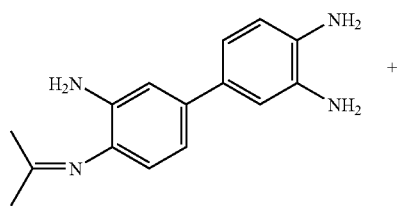

+

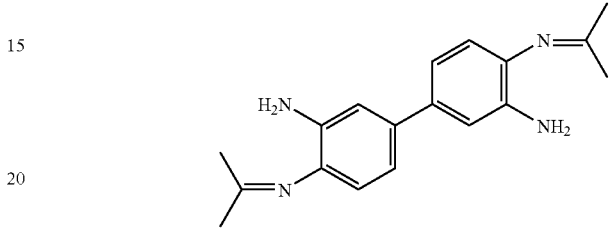

In a 200-ml flask equipped with a Soxhlet extractor including molecular sieves 4A as a dehydrating agent, a stirrer, a condenser and a thermometer were placed 21.4 g (100 mmol) of 3,3'-diaminobenzidine, 100 ml of acetone and 3.0 g (50 mmol) of acetic acid, followed by heating under reflux in a nitrogen atmosphere for 3 hours. After cooling to room temperature, acetone was removed under reduced pressure, and the residue was purified by silica gel chromatography to yield 16.5 g (65 mmol) of 3,3'-diaminobenzidine monoisopropanimine [N'-isopropylidene-3,4,3',4'-biphenyltetramine] and 4.7 g (16 mmol) of 3,3'-diaminobenzidine diisopropanimine [N',N'''-diisopropylidene-3,4,3',4'-biphenyltetramine].

[Spectral Data of 3,3'-diaminobenzidine monoisopropanimine]

Infrared absorption spectral data (cm$^{-1}$):
1628 (C=N)
MS: 255 (M+H), 238, 198

[Spectral Data of 3,3'-diaminobenzidine diisopropanimine]

Infrared absorption spectral data (cm$^{-1}$):
1627 (C=N)
MS: 295 (M+H), 278, 238

PREPARATION EXAMPLE 10

Preparation of 3,3'-dihydroxybenzidine diisopropanimine[N,N'-diisopropylidene-3,3'-dihydroxybenzidine]

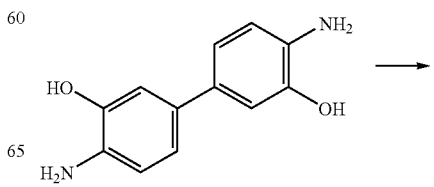

-continued

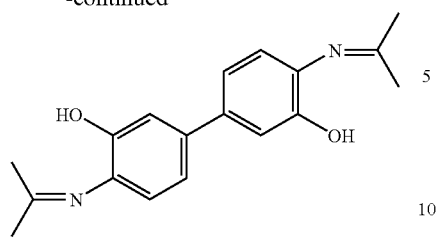

In a 200-ml flask equipped with a Soxhlet extractor including molecular sieves 4A as a dehydrating agent, a stirrer, a condenser and a thermometer were placed 21.6 g (100 mmol) of 3,3'-dihydroxybenzidine, 100 ml of acetone and 0.95 g (5 mmol) of p-toluenesulfonic acid monohydrate, followed by heating under reflux in a nitrogen atmosphere for 3 hours. After cooling to room temperature, acetone was removed under reduced pressure, and the residue was purified by silica gel chromatography to yield 21.3 g (72 mmol) of target 3,3'-dihydroxybenzidine diisopropanimine[N,N'-diisopropylidene-3,3'-dihydroxybenzidine] in a yield of 72%.

Infrared absorption spectral data (cm$^{-1}$):
1628 (C=N)
MS: 297 (M+H), 279, 240

PREPARATION EXAMPLE 11

Preparation of 3,3'-diaminobenzidine tetraacetylamide

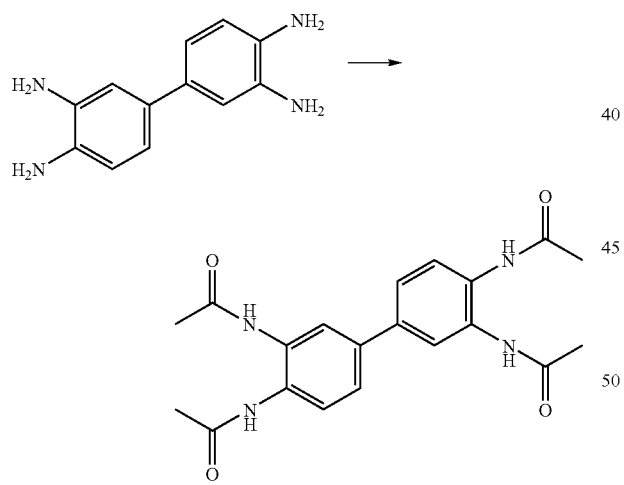

In a 500-ml flask equipped with a stirrer, a thermometer and a condenser were placed 21.4 g (100 mmol) of 3,3'-diaminobenzidine, 102.1 g (1 mol) of acetic anhydride and 100 ml of acetic acid, followed by heating with stirring at 100° C. in a nitrogen atmosphere for 5 hours. After cooling to room temperature, acetic acid was removed under reduced pressure, the residue was dissolved in ethyl acetate, was washed with water and 10% aqueous sodium carbonate solution, and ethyl acetate was removed under reduced pressure. The residue was purified by silica gel chromatography to yield 31.4 g (82 mmol) of target 3,3'-diaminobenzidine tetraacetylamide in a yield of 82%.

Infrared absorption spectral data (cm$^{-1}$):
1665, 1538, 2394 (each amido group)
MS: 383 (M+H), 341, 43

PREPARATION EXAMPLE 12

Preparation of 3,3'-diacetoxybenzidine diacetylamide

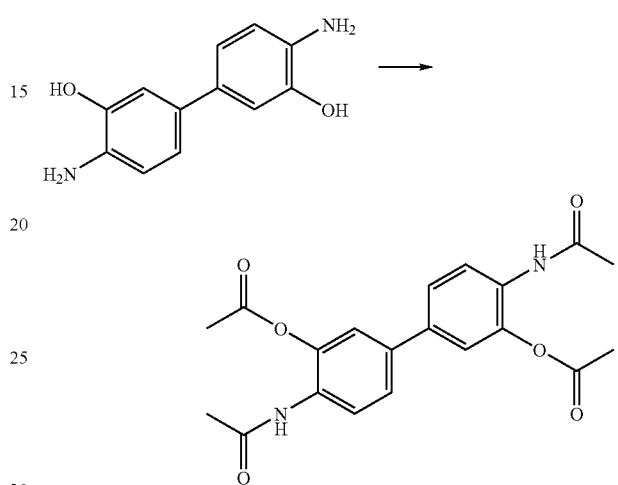

In a 500-ml flask equipped with a stirrer, a thermometer and a condenser were placed 21.6 g (100 mmol) of 3,3'-dihydroxybenzidine, 102.1 g (1 mol) of acetic anhydride and 100 ml of acetic acid, followed by heating with stirring at 100° C. in a nitrogen atmosphere for 5 hours. After cooling to room temperature, acetic acid was removed under reduced pressure, and the residue was dissolved in ethyl acetate, was washed with water and 10% aqueous sodium carbonate solution, and ethyl acetate was removed under reduced pressure. The residue was purified by silica gel chromatography to yield 32.7 g (85 mmol) of target 3,3'-diacetoxybenzidine diacetylamide in a yield of 85%.

Infrared absorption spectral data (cm$^{-1}$):
1694 (ester group), 1663 (amido group), 1530 (amido group)
MS: 385 (M+H), 343, 43

EXAMPLE 1

In 100 g of mesitylene at room temperature in a nitrogen atmosphere were dissolved 2.48 g (8 mmol) of trimethyl ester of 1,3,5-adamantanetricarboxylic acid prepared in Preparation Example 1 and 6.42 g (12 mmol) of 3,3'-diaminobenzidine tetracyclohexanimine [N,N',N'',N'''-tetracyclohexylidene-3,4,3',4'-biphenyltetramine] prepared in Preparation Example 7, to yield a coating liquid having a monomer concentration of 8.2% by weight. After filtrating through a filter with a pore size of 0.1 μm, the coating liquid was applied to an 8-inch silicon wafer by spin coating. In a nitrogen atmosphere, this was heated at 300° C. for 30 minutes and was then heated at 400° C. for further 30 minutes, to form a film. The infrared absorption spectrum of the polymer film was determined. The result is shown in FIG. 1, verifying that the target crosslinked polybenzimidazole film had been. The film had a thickness of 300 nm.

Infrared absorption spectral data (cm$^{-1}$):
805 (m), 1280 (m), 1403 (m), 1450 (s), 1522 (w), 1625 (w), 2857 (s), 2928 (s), 3419 (w)

COMPARATIVE EXAMPLE 1

A coating liquid was prepared by the procedure of Example 1, except using 1,3,5-adamantanetricarboxylic acid and 3,3'-diaminobenzidine in the same amounts as in Example 1 instead of trimethyl ester of 1,3,5-adamantanetricarboxylic acid and N,N',N'',N'''-tetracyclohexylidene-3,4, 3',4'-biphenyltetra mine, respectively. However, the components were not sufficiently dissolved in the solvent (mesitylene). Accordingly, another coating liquid having a monomer concentration of 1.2% by weight was prepared by the procedure of Example 1, except using 0.54 g (2 mmol) of 1,3,5-adamantanetricarboxylic acid and 0.64 g (3 mmol) of 3,3'-diaminobenzidine. A polymer film was prepared by the procedure of Example 1, except using the above-prepared coating liquid. The infrared absorption spectrum of the polymer film was determined, to find that the target crosslinked polybenzimidazole film had been formed. The film had a thickness of less than 20 nm.

EXAMPLE 2

In 100 g of methyl isobutyl ketone (MIBK) at room temperature in a nitrogen atmosphere were dissolved 4.42 g (12 mmol) of tetramethyl ester of 1,3,5,7-adamantanetetracarboxylic acid and 12.83 g (24 mmol) of 3,3'-diaminobenzidine tetracyclohexanimine [N,N',N'',N'''-tetracyclohexylidene-3,4,3',4'-biphenyltetramine] prepared in Preparation Example 7, to yield a coating liquid having a monomer concentration of 14.7% by weight. After filtrating through a filter with a pore size of 0.1 µm, the coating liquid was applied to an 8-inch silicon wafer by spin coating. In a nitrogen atmosphere, this was heated at 300° C. for 30 minutes and was then heated at 400° C. for further 30 minutes, to form a film. The infrared absorption spectrum of the polymer film was determined, to find that the target crosslinked polybenzimidazole film had been formed. The film had a thickness of 400 nm.

COMPARATIVE EXAMPLE 2

A coating liquid was prepared by the procedure of Example 2, except using 1,3,5,7-adamantanetetracarboxylic acid and 3,3'-diaminobenzidine in the same amounts as in Example 2 instead of tetramethyl ester of 1,3,5,7-adamantanetetracarboxylic acid and N,N',N'',N'''-tetracyclohexylidene-3,4,3',4'-biphenyltetra mine, respectively. However, the components were not sufficiently dissolved in the solvent (MIBK). Accordingly, another coating liquid having a monomer concentration of 1.5% by weight was prepared by the procedure of Example 2, except using 0.62 g (2 mmol) of 1,3,5,7-adamantanetetracarboxylic acid and 0.86 g (4 mmol) of 3,3'-diaminobenzidine. A polymer film was prepared by the procedure of Example 2, except using the above-prepared coating liquid. The infrared absorption spectrum of the polymer film was determined, to find that the target crosslinked polybenzimidazole film had been formed. The film had a thickness of less than 20 nm.

EXAMPLE 3

In 100 g of dioxane at room temperature in a nitrogen atmosphere were dissolved 4.29 g (16 mmol) of 1,3,5-adamantanetricarboxylic acid and 8.99 g (24 mmol) of 3,3'-diaminobenzidine tetraisopropanimine [N,N',N'',N'''-tetraisopropylidene-3,4,3',4'-biphenyltetramine] prepared in Preparation Example 8, to yield a coating liquid having a monomer concentration of 11.7% by weight. After filtrating through a filter with a pore size of 0.1 µm, the coating liquid was applied to an 8-inch silicon wafer by spin coating. In a nitrogen atmosphere, this was heated at 300° C. for 30 minutes and was then heated at 400° C. for further 30 minutes, to form a film. The infrared absorption spectrum of the polymer film was determined, to find that the target crosslinked polybenzimidazole film had been formed. The film had a thickness of 360 nm.

EXAMPLE 4

A coating liquid having a monomer concentration of 9.6% by weight was prepared by the procedure of Example 3, except that 4.88 g (19.2 mmol) of 3,3'-diaminobenzidine monoisopropanimine [N'-isopropylidene-3,4,3',4'-biphenyltetramine] and 1.41 g (4.8 mmol) of 3,3'-diaminobenzidine diisopropanimine [N',N'''-diisopropylidene-3,4,3',4'-biphenyltetramine] prepared in Preparation Example 9 were used as the aromatic polyamine derivative instead of N,N', N'',N'''-tetraisopropylidene-3,4,3',4'-biphenyltetramine. A polymer film was prepared by the procedure of Example 3, except using the above-prepared coating liquid. The infrared absorption spectrum of the polymer film was determined, to find that the target crosslinked polybenzimidazole film had been formed. The film had a thickness of 300 nm.

EXAMPLE 5

A coating liquid having a monomer concentration of 11.9% by weight was prepared by the procedure of Example 3, except that 9.18 g (24 mmol) of 3,3'-diaminobenzidine tetraacetylamide prepared in Preparation Example 11 was used as the aromatic polyamine derivative instead of N,N', N'',N'''-tetraisopropylidene-3,4,3',4'-biphenyltetramine. A crosslinked polybenzimidazole film was prepared by the procedure of Example 3, except using the above-prepared coating liquid. The film had a thickness of 360 nm.

COMPARATIVE EXAMPLE 3

A coating liquid was prepared by the procedure of Example 3, except that 1,3,5-adamantanetricarboxylic acid, and 3,3'-diaminobenzidine instead of N,N',N'',N'''-tetraisopropylidene-3,4,3',4'-biphenyltetramine were used in the same amounts as in Example 3. However, the components were not sufficiently dissolved in the solvent (dioxane). Accordingly, another coating liquid having a monomer concentration of 2.3% by weight was prepared by the procedure of Example 3, except using 1.07 g (4 mmol) of 1,3,5-adamantanetricarboxylic acid and 1.29 g (6 mmol) of 3,3'-diaminobenzidine. A polymer film was prepared by the procedure of Example 3, except using the above-prepared coating liquid. The infrared absorption spectrum of the polymer film was determined, to find that the target crosslinked polybenzimidazole film had been formed. The film had a thickness of less than 20 nm.

EXAMPLE 6

In 100 g of propylene glycol monomethyl ether (PGME) at room temperature in a nitrogen atmosphere were dissolved 3.76 g (14 mmol) of 1,3,5-adamantanetricarboxylic acid and 8.07 g (21 mmol) of 3,3'-diacetoxybenzidine diacetylamide prepared in Preparation Example 12, to yield a coating liquid having a monomer concentration of 10.6% by weight. After filtrating through a filter with a pore size of 0.1 μm, the coating liquid was applied to an 8-inch silicon wafer by spin coating. In a nitrogen atmosphere, this was heated at 300° C. for 30 minutes and was then heated at 400° C. for further 30 minutes, to form a film. The infrared absorption spectrum of the polymer film was determined, to find that the target crosslinked polybenzoxazole film had been formed. The film had a thickness of 340 nm.

EXAMPLE 7

A coating liquid having a monomer concentration of 9.1% by weight was prepared by the procedure of Example 6, except that 6.22 g (21 mmol) of 3,3'-dihydroxybenzidine diisopropanimine [N,N'-diisopropylidene-3,3'-dihydroxybenzidine] prepared in Preparation Example 10 was used as the aromatic polyamine derivative instead of 3,3'-diacetoxybenzidine diacetylamide. A polymer film was prepared by the procedure of Example 6, except using the above-prepared coating liquid. The infrared absorption spectrum of the polymer film was determined, to find that the target crosslinked polybenzoxazole film had been formed. The film had a thickness of 300 nm.

COMPARATIVE EXAMPLE 4

A coating liquid was prepared by the procedure of Example 6, except that 1,3,5-adamantanetricarboxylic acid, and 3,3'-dihydroxybenzidine instead of 3,3'-diacetoxybenzidine diacetylamide were used in the same amount as in Example 6. However, the components were not sufficiently dissolved in the solvent (propylene glycol monomethyl ether: PGME). Accordingly, another coating liquid having a monomer concentration of 2.3% by weight was prepared by the procedure of Example 6, except using 1.07 g (4 mmol) of 1,3,5-adamantanetricarboxylic acid and 1.30 g (6 mmol) of 3,3'-dihydroxybenzidine. A polymer film was prepared by the procedure of Example 6, except using the above-prepared coating liquid. The infrared absorption spectrum of the polymer film was determined, to find that the target crosslinked polybenzoxazole film had been formed. The film had a thickness of less than 20 nm.

EXAMPLE 8

In 100 g of methyl dimethylacetamide (DMAC) at room temperature in a nitrogen atmosphere were dissolved 18.42 g (50 mmol) of tetramethyl ester of 1,3,5,7-adamantanetetracarboxylic acid and 21.43 g (100 mmol) of 3,3'-diaminobenzidine, to yield a coating liquid having a monomer concentration of 28.5% by weight. After filtrating through a filter with a pore size of 0.1 μm, the coating liquid was applied to an 8-inch silicon wafer by spin coating. In a nitrogen atmosphere, this was heated at 300° C. for 30 minutes and was then heated at 400° C. for further 30 minutes, to form a film. The infrared absorption spectrum of the polymer film was determined, to find that the target crosslinked polybenzimidazole film had been formed. The film had a thickness of 800 nm.

EXAMPLE 9

A coating liquid having a monomer concentration of 32.6% by weight was prepared by the procedure of Example 8, except using 26.84 g (50 mmol) of tetra-t-butyl ester of 1,3,5,7-adamantanetetracarboxylic acid as the adamantanepolycarboxylic acid derivative instead of tetramethyl ester of 1,3,5,7-adamantanetetracarboxylic acid. A polymer film was prepared by the procedure of Example 8, except using the above-prepared coating liquid. The infrared absorption spectrum of the film was determined, to find that the target polybenzimidazole film had been formed. The film had a thickness of 900 nm.

EXAMPLE 10

A coating liquid having a monomer concentration of 32.5% by weight was prepared by the procedure of Example 8, except using 26.64 g (50 mmol) of 1,3,5,7-tetrakis(N,N-diethylcarbamoyl)adamantane as the adamantanepolycarboxylic acid derivative instead of tetramethyl ester of 1,3,5,7-adamantanetetracarboxylic acid. A polymer film was prepared by the procedure of Example 8, except using the above-prepared coating liquid, and the infrared absorption spectrum of the film was determined, to find that the target polybenzimidazole film had been formed. The film had a thickness of 800 nm.

EXAMPLE 11

In 100 g of a 70:30 (by weight) mixture of methyl dimethylacetamide (DMAC) and tetrahydrofuran (THF) at room temperature in a nitrogen atmosphere were dissolved 21.47 g (40 mmol) of tetramethyl ester of 1,3,5,7-adamantanetetracarboxylic acid and 17.14 g (80 mmol) of 3,3'-diaminobenzidine, to yield a coating liquid having a monomer concentration of 27.9% by weight. After filtrating through a filter with a pore size of 0.1 μm, the coating liquid was applied to an 8-inch silicon wafer by spin coating. In a nitrogen atmosphere, this was heated at 300° C. for 30 minutes and was then heated at 400° C. for further 30 minutes, to form a film. The infrared absorption spectrum of the polymer film was determined, to find that the target crosslinked polybenzimidazole film had been formed. The film had a thickness of 750 nm.

EXAMPLE 12

In 100 g of methyl benzoate at room temperature in a nitrogen atmosphere were dissolved 5.37 g (10 mmol) of tetramethyl ester of 1,3,5,7-adamantanetetracarboxylic acid and 5.81 g (20 mmol) of 1,5-diamino-2,4-bis(phenylamino)benzene, to yield a coating liquid having a monomer concentration of 10.1% by weight. After filtrating through a filter with a pore size of 0.1 μm, the coating liquid was applied to an 8-inch silicon wafer by spin coating. In a nitrogen atmosphere, this was heated at 300° C. for 30 minutes and was then heated at 400° C. for further 30 minutes, to form a film. The infrared absorption spectrum of the polymer film was determined, to find that the target crosslinked polybenzimidazole film had been formed. The film had a thickness of 320 nm.

COMPARATIVE EXAMPLE 5

In a flask equipped with a stirrer and a condenser were placed 5.37 g (20 mmol) of 1,3,5-adamantanetricarboxylic acid, 6.43 g (30 mmol) of 3,3'-diaminobenzidine and 100 g of a polyphosphoric acid, followed by heating and stirring at 200° C. in a nitrogen atmosphere for 12 hours. After cooling, the reaction mixture was mixed with water, the precipitated solid was collected by filtration and was washed with aqueous sodium hydrogen carbonate solution, water, and methanol, to yield a polybenzimidazole as a solid. An attempt was made to dissolve the solid polybenzimidazole in a solvent, N-methylpyrrolidone (NMP), but failed. Thus, a thin film could not be formed by spin coating, and a target thin film was not prepared.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A material for dielectric films, which is a polymerizable composition comprising:

an adamantanepolycarboxylic acid derivative represented by following Formula (1):

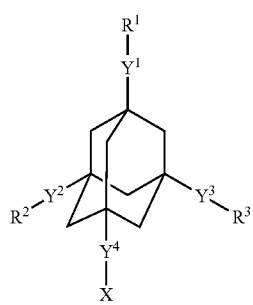

(1)

wherein X is a hydrogen atom, a hydrocarbon group or $R^4$ which is a carbonyl halide group or a carboxyl group which may be protected by a protecting group which is selected from an alkoxy group, a cycloalkyloxy group, a tetrahydrofuranyloxy group, tetrahydropyranyloxy group, an aryloxy group, an aralkyloxy group, a trialkylsilyloxy group, an amino group, a hydrazino group; $R^1$, $R^2$, and $R^3$ may be the same as or different from one another and are each a carbonyl halide group or a carboxyl group which may be protected by a protecting group which is selected from an alkoxy group, a cycloalkyloxy group, a tetrahydrofuranyloxy group, tetrahydropyranyloxy group, an aryloxy group, an aralkyloxy group, a trialkylsilyloxy group, an amino group, a hydrazino group; and $Y^1$, $Y^2$, $Y^3$ and $Y^4$ may be the same as or different from one another and are each a single bond or a bivalent aromatic cyclic group, wherein at least one of $R^1$, $R^2$ and $R^3$ is a carbonyl halide group or a protected carboxyl group when X is a hydrogen atom or a hydrocarbon group, and at least one of $R^1$, $R^2$, $R^3$ and $R^4$ is a carbonyl halide group or a protected carboxyl group when X is $R^4$;

an aromatic polyamine derivative represented by following Formula (2):

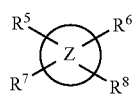

(2)

wherein Ring Z is a monocyclic or polycyclic aromatic ring; $R^5$, $R^6$, $R^7$ and $R^8$ are each a substituent bound to Ring Z, $R^5$ and $R^6$ may be the same as or different from each other and are each an amino group which may be protected by a protecting group which is selected from an acyl group, an alkoxycarbonyl group, an aralkyloxycarbonyl group, an alkylidene group, a carbonyl group, an oxalyl group and a butane-2,3-diylidene group, and $R^7$ and $R^8$ may be the same as or different from each other and are each an amino group which may be protected by a protecting group which is selected from an acyl group, an alkoxycarbonyl group, an aralkyloxycarbonyl group, an alkylidene group, a carbonyl group, an oxalyl group, a butane-2,3-diylidene group, a hydroxyl group which may be protected by a protecting group which is selected from an alkyl group, a cycloalkyl group, an aralkyl group, a substituted methyl group, a substituted ethyl group, an acyl group, an alkoxycarbonyl group, an aralkyloxycarbonyl group, or a mercapto group which may be protected by a protecting group which is selected from an alkyl group, a cycloalkyl group, an aralkyl group, a substituted methyl group, a substituted ethyl group, an acyl group, an alkoxycarbonyl group, an aralkyloxycarbonyl group, wherein at least one of $R^7$ and $R^8$ is a protected amino group, a protected hydroxyl group or a protected mercapto group when $R^5$ and $R^6$ are both unprotected amino groups; and an organic solvent, the adamantanepolycarboxylic acid derivative and the aromatic polyamine derivative being dissolved in the organic solvent.

2. A material for dielectric films, which is a polymerizable composition comprising:

an adamantanepolycarboxylic acid represented by following Formula (1a):

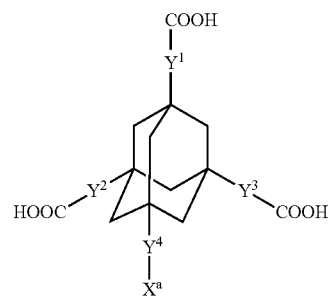

(1a)

wherein $X^a$ is a hydrogen atom, a carboxyl group or a hydrocarbon group; and $Y^1$, $Y^2$, $Y^3$ and $Y^4$ may be the same as or different from one another and are each a single bond or a bivalent aromatic cyclic group;

an aromatic polyamine derivative represented by following Formula (2):

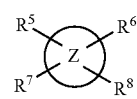

(2)

wherein Ring Z is a monocyclic or polycyclic aromatic ring; $R^5$, $R^6$, $R^7$ and $R^8$ are each a substituent bound to Ring Z, $R^5$ and $R^6$ may be the same as or different from each other and are each an amino group which may be protected by a protecting group which is selected from an acyl group, an alkoxycarbonyl group, an aralkyloxycarbonyl group, an alkylidene group, a carbonyl group, an oxalyl group, a butane-2,3-diylidene group, and $R^7$ and $R^8$ may be the same as or different from each other and are each an amino group which may be protected by a protecting group which is selected from an acyl group, an alkoxycarbonyl group, an aralkyloxycarbonyl group, an alkylidene group, a carbonyl group, an oxalyl group, a butane-2,3-diylidene group, a hydroxyl group which may be protected by a protecting group which is selected from an alkyl group, a cycloalkyl group, an aralkyl group, a substituted methyl group, a substituted ethyl group, an acyl group, an alkoxycarbonyl group, an aralkyloxycarbonyl group, or a mercapto group which may be protected by a protecting group which is selected from an alkyl group, a cycloalkyl group, an aralkyl group, a substituted methyl group, a substituted ethyl group, an acyl group, an alkoxycarbonyl group, an aralkyloxycarbonyl group, wherein at least one of $R^7$ and $R^8$ is a protected amino group, a protected hydroxyl group or a protected mercapto group when $R^5$ and $R^6$ are both unprotected amino groups; and an organic solvent, the adamantanepolycarboxylic acid and the aromatic polyamine derivative being dissolved in the organic solvent.

3. A material for dielectric films, which is a polymerizable composition comprising:

an adamantanepolycarboxylic acid derivative represented by following Formula (1):

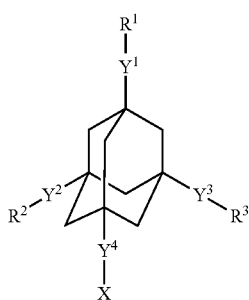

(1)

wherein X is a hydrogen atom, a hydrocarbon group or $R^4$ which is a carbonyl halide group or a carboxyl group which may be protected by a protecting group which is selected from an alkoxy group, a cycloalkyloxy group, a tetrahydrofuranyloxy group, tetrahydropyranyloxy group, an aryloxy group, an aralkyloxy group, a trialkylsilyloxy group, an amino group, a hydrazino group; $R^1$, $R^2$, and $R^3$ may be the same as or different from one another and are each a carbonyl halide group or a carboxyl group which may be protected by a protecting group which is selected from an alkoxy group, a cycloalkyloxy group, a tetrahydrofuranyloxy group, tetrahydropyranyloxy group, an aryloxy group, an aralkyloxy group, a trialkylsilyloxy group, an amino group, a hydrazino group; and $Y^1$, $Y^2$, $Y^3$ and $Y^4$ may be the same as or different from one another and are each a single bond or a bivalent aromatic cyclic group, wherein at least one of $R^1$, $R^2$ and $R^3$ is a carbonyl halide group or a protected carboxyl group when X is a hydrogen atom or a hydrocarbon group, and at least one of $R^1$, $R^2$, $R^3$ and $R^4$ is a carbonyl halide group or a protected carboxyl group when X is $R^4$;

an aromatic polyamine represented by following Formula (2a):

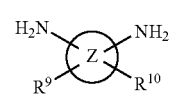

(2a)

wherein Ring Z is a monocyclic or polycyclic aromatic ring; and $R^9$ and $R^{10}$ are each a substituent bound to Ring Z, may be the same as or different from each other and are each an amino group, a hydroxyl group or a mercapto group; and an organic solvent, the adamantanepolycarboxylic acid derivative and the aromatic polyamine being dissolved in the organic solvent.

4. A polymer which is a polymerized product of:

an adamantanepolycarboxylic acid derivative represented by following Formula (1):

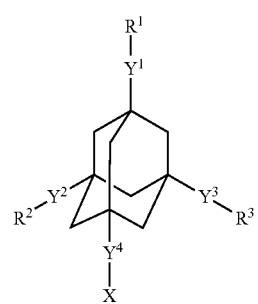

(1)

wherein X is a hydrogen atom, a hydrocarbon group or $R^4$ which is a carbonyl halide group or a carboxyl group which may be protected by a protecting group which is selected from an alkoxy group, a cycloalkyloxy group, a tetrahydrofuranyloxy group, tetrahydropyranyloxy group, an aryloxy group, an aralkyloxy group, a trialkylsilyloxy group, an amino group, a hydrazino group; $R^1$, $R^2$, and $R^3$ may be the same as or different from one another and are each a carbonyl halide group or a carboxyl group which may be protected by a protecting group which is selected from an alkoxy group, a cycloalkyloxy group, a tetrahydrofuranyloxy group, tetrahydropyranyloxy group, an aryloxy group, an aralkyloxy group, a trialkylsilyloxy group, an amino group, a hydrazino group; and $Y^1$, $Y^2$, $Y^3$ and $Y^4$ may be the same as or different from one another and are each a single bond or a bivalent aromatic cyclic group, wherein at least one of $R^1$, $R^2$ and $R^3$ is a carbonyl halide group or a protected carboxyl group when X is a hydrogen atom or a hydrocarbon group, and at least one of $R^1$, $R^2$, $R^3$ and $R^4$ is a carbonyl halide group or a protected carboxyl group when X is $R^4$; and an aromatic polyamine derivative represented by following Formula (2):

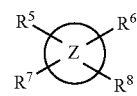

(2)

wherein Ring Z is a monocyclic or polycyclic aromatic ring; $R^1$, $R^2$, $R^7$ and $R^8$ are each a substituent bound to Ring Z, $R^5$ and $R^6$ may be the same as or different from each other and are each an amino group which may be protected by a protecting group which is selected from an acyl group, an alkoxycarbonyl group, an aralkyloxy-carbonyl group, an alkylidene group, and $R^7$ and $R^8$ may be the same as or different from each other and are each an amino group which may be protected by a protecting group which is selected from an acyl group, an alkoxycarbonyl group, an aralkyloxy-carbonyl group, an alkylidene group, a carbonyl group, an oxalyl group, a butane-2,3-diylidene group, a hydroxyl group which may be protected by a protecting group which is selected from an alkyl group, a cycloalkyl group, an aralkyl group, a substituted methyl group, a substituted ethyl group, an acyl group, an alkoxycarbonyl group, an aralkyloxycarbonyl group, or a mercapto group which may be protected by a protecting group which is selected from an alkyl group, a cycloalkyl group, an aralkyl group, a substituted methyl group, a substituted ethyl group, an acyl group, an alkoxycarbonyl group, an aralkyloxycarbonyl group, wherein at least one of $R^7$ and $R^8$ is a protected amino group, a protected hydroxyl group or a protected mercapto group when $R^5$ and $R^6$ are both unprotected amino groups.

5. A polymer which is a polymerized product of:

an adamantanepolycarboxylic acid represented by following Formula (1a):

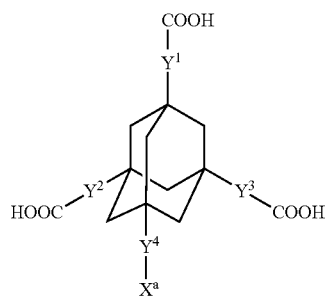

(1a)

wherein $X^a$ is a hydrogen atom, a carboxyl group or a hydrocarbon group; and $Y^1$, $Y^2$, $Y^3$ and $Y^4$ may be the same as or different from one another and are each a single bond or a bivalent aromatic cyclic group; and an aromatic polyamine derivative represented by following Formula (2):

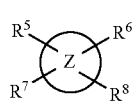

(2)

wherein Ring Z is a monocyclic or polycyclic aromatic ring; $R^5$, $R^6$, $R^7$ and $R^8$ are each a substituent bound to Ring Z, $R^5$ and $R^6$ may be the same as or different from each other and are each an amino group which may be protected by a protecting group which is selected from an acyl group, an alkoxycarbonyl group, an aralkyloxycarbonyl group, an alkylidene group, a carbonyl group, an oxalyl group and a butane-2,3-diyliene group, and $R^7$ and $R^8$ may be the same as or different from each other and are each an amino group which may be protected by a protecting group which is selected from an acyl group, an alkoxycarbonyl group, an aralkyloxycarbonyl group, an alkylidene group, a carbonyl group, an oxalyl group, a butane-2,3-diylidene group, a hydroxyl group which may be protected by a protecting group which is selected from an alkyl group, a cycloalkyl group, an aralkyl group, a substituted methyl group, a substituted ethyl group, an acyl group, an alkoxycarbonyl group, an aralkyloxycarbonyl group, or a mercapto group which may be protected by a protecting group which is selected from an alkyl group, a cycloalkyl group, an aralkyl group, a substituted methyl group, a substituted ethyl group, an acyl group, an alkoxycarbonyl group, an aralkyloxycarbonyl group, wherein at least one of $R^7$ and $R^8$ is a protected amino group, a protected hydroxyl group or a protected mercapto group when $R^5$ and $R^6$ are both unprotected amino groups.

6. A polymer which is a polymerized product of:

an adamantanepolycarboxylic acid derivative represented by following Formula (1):

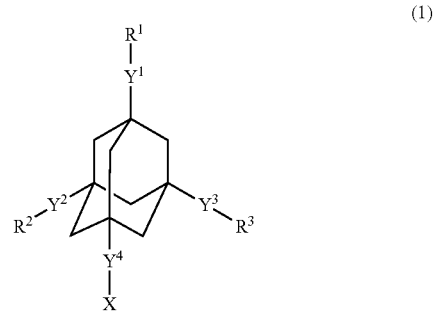

(1)

wherein X is a hydrogen atom, a hydrocarbon group or $R^4$ which is a carbonyl halide group or a carboxyl group which may be protected by a protecting group which is selected from an alkoxy group, a cycloalkyloxy group, a tetrahydrofuranyloxy group, tetrahydropyranyloxy group, an aryloxy group, an aralkyloxy group, a trialkylsilyloxy group, an amino group, a hydrazino group; $R^1$, $R^2$, and $R^3$ may be the same as or different from one another and are each a carbonyl halide group or a carboxyl group which may be protected by a protecting group which is selected from an alkoxy group, a cycloalkyloxy group, a tetrahydrofuranyloxy group, tetrahydropyranyloxy group, an aryloxy group, an aralkyloxy group, a trialkylsilyloxy group, an amino group, a hydrazino group; and $Y^1$, $Y^2$, $Y^3$ and $Y^4$ may be the same as or different from one another and are each a single bond or a bivalent aromatic cyclic group, wherein at least one of $R^1$, $R^2$ and $R^3$ is a carbonyl halide group or a protected carboxyl group when X is a hydrogen atom or a hydrocarbon group, and at least one of $R^1$, $R^2$, $R^3$ and $R^4$ is a carbonyl halide group or a protected carboxyl group when X is $R^4$; and an aromatic polyamine represented by following Formula (2a):

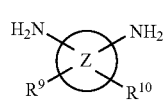

(2a)

wherein Ring Z is a monocyclic or polycyclic aromatic ring; and $R^9$ and $R^{10}$ are each a
substituent bound to Ring Z, may be the same as or different from each other and are each an amino group, a hydroxyl group or a mercapto group.

7. A dielectric film comprising the polymer as claimed in any one of claims 4 to 6.

* * * * *